US011880957B2

(12) United States Patent
Li et al.

(10) Patent No.: US 11,880,957 B2
(45) Date of Patent: Jan. 23, 2024

(54) FEW-SHOT IMAGE GENERATION VIA SELF-ADAPTATION

(71) Applicant: Adobe Inc., San Jose, CA (US)

(72) Inventors: Yijun Li, Seattle, WA (US); Richard Zhang, San Francisco, CA (US); Jingwan Lu, Santa Clara, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 599 days.

(21) Appl. No.: 17/013,332

(22) Filed: Sep. 4, 2020

(65) Prior Publication Data
US 2022/0076374 A1 Mar. 10, 2022

(51) Int. Cl.
G06T 3/00 (2006.01)
G06N 20/00 (2019.01)
G06T 11/00 (2006.01)

(52) U.S. Cl.
CPC ........... G06T 3/0056 (2013.01); G06N 20/00 (2019.01); G06T 11/00 (2013.01); G06T 2207/20081 (2013.01)

(58) Field of Classification Search
None
See application file for complete search history.

(56) References Cited

U.S. PATENT DOCUMENTS

2019/0279075 A1* 9/2019 Liu .................. G06N 3/045
2021/0397868 A1* 12/2021 Kim ................. G06T 11/00

OTHER PUBLICATIONS

Bartunov et al., Fast Adaptation in Generative Models with Generative Matching Networks, Available Online at: arXiv preprint arXiv:1612.02192, Dec. 7, 2016, pp. 1-12.
Brock et al., Large Scale GAN Training for High Fidelity Natural Image Synthesis, Available Online at: arXiv preprint arXiv:1809.11096, Feb. 25, 2019, pp. 1-35.
Choi et al., Stargan v2: Diverse Image Synthesis for Multiple Domains, In CVPR, Available Online at: https://arxiv.org/pdf/1912.01865.pdf, Apr. 26, 2020, pp. 1-14.

(Continued)

Primary Examiner — Joni Hsu
(74) Attorney, Agent, or Firm — Kilpatrick Townsend & Stockton LLP

(57) ABSTRACT

One example method involves operations for receiving a request to transform an input image into a target image. Operations further include providing the input image to a machine learning model trained to adapt images. Training the machine learning model includes accessing training data having a source domain of images and a target domain of images with a target style. Training further includes using a pre-trained generative model to generate an adapted source domain of adapted images having the target style. The adapted source domain is generated by determining a rate of change for parameters of the target style, generating weighted parameters by applying a weight to each of the parameters based on their respective rate of change, and applying the weighted parameters to the source domain. Additionally, operations include using the machine learning model to generate the target image by modifying parameters of the input image using the target style.

20 Claims, 13 Drawing Sheets

(56) References Cited

OTHER PUBLICATIONS

Denton et al., Deep Generative Image Models Using a Laplacian Pyramid of 317 Adversarial Networks, In NIPS, Available Online at: https://arxiv.org/pdf/1506.05751.pdf?source=post, pp. 1-10, Jun. 18, 2015, pp. 1-10.
Finn et al., Model-Agnostic Meta-Learning for Fast Adaptation of Deep Networks, In ICML, Available Online at: https://arxiv.org/pdf/1703.03400.pdf, Jul. 18, 2017, 13 pages.
Gatys et al., Image Style Transfer Using Convolutional Neural Networks, In CVPR, Available Online at: https://rn-unison.github.io/articulos/style_transfer.pdf, 2016, pp. 2414-2423.
Gidaris et al., Dynamic Few-Shot Visual Learning without Forgetting, In CVPR, Available Online at: https://openaccess.thecvf.com/content_cvpr_2018/papers/Gidaris_Dynamic_Few-Shot_Visual_CVPR_2018_paper.pdf, 2018, pp. 4367-4375.
Goodfellow et al., Generative Adversarial Nets, In NIPS, Available Online at: 2014, pp. 1-9.
Hertzmann et al., Image Analogies, ACM SIGGRAPH, Available Online at : https://dl.acm.org/doi/pdf/10.1145/383259.383295, Aug. 12-17, 2001, pp. 327-340.
Heusel et al., GANs Trained by a Two Time-Scale Update Rule Converge to a Local Nash Equilibrium, In NIPS, Available Online at: https://dl.acm.org/doi/pdf/10.5555/3295222.3295408, Dec. 2017, pp. 1-12.
Hua et al., Unsupervised Cross-Domain Image Generation, In Stanford Course Project CS229, Available Online at: http://cs229.stanford.edu/proj2017/final-reports/5241608.pdf, 2017, 6 pages.
Huang et al., Arbitrary Style Transfer in Real-Time with Adaptive Instance Normalization, Available Online at: arXiv preprint arXiv:1703.06868, Jul. 30, 2017, pp. 1-11.
Isola et al., Image-to-Image Translation with Conditional Adversarial Networks, In CVPR, Available Online at: http://gangw.cs.illinois.edu/class/cs598/papers/CVPR17-img2img.pdf, 2017, pp. 1125-1134.
Johnson et al., Perceptual Losses for Real-Time Style Transfer and Super-Resolution, In ECCV, Available Online at: https://arxiv.org/pdf/1603.08155.pdf%7C, Mar. 27, 2016, pp. 1-18.
Karras et al., A Style-Based Generator Architecture for Generative Adversarial Networks, In CVPR, Available Online at: https://openaccess.thecvf.com/content_CVPR_2019/papers/Karras_A_Style-Based_Generator_Architecture_for_Generative_Adversarial_Networks_CVPR_2019_paper.pdf, 2019, pp. 4401-4410.
Karras et al., Progressive Growing of GANs for Improved Quality, Stability, and Variation, Available Online at: arXiv preprint arXiv:1710.10196, Feb. 26, 2018, pp. 1-26.
Kirkpatrick et al., Overcoming Catastrophic Forgetting in Neural Networks, Proceedings of the National Academy of Sciences, vol. 114, No. 13, Mar. 28, 2017, pp. 3521-3526.
Lake et al., Human-Level Concept Learning Through Probabilistic Program Induction, Science, vol. 350, No. 6266, Dec. 11, 2015, pp. 1332-1338.
Li et al., A Closed-Form Solution to Photorealistic Image Stylization, In ECCV, Available Online at: https://www.ecva.net/papers/eccv_2018/papers_ECCV/papers/Yijun_Li_A_Closed-form_Solution_ECCV_2018_paper.pdf, 2018, pp. 1-16.
Li et al., Learning to Self-Train for Semi-Supervised Few-Shot Classification, In NIPS, Available Online at: https://arxiv.org/pdf/1906.00562.pdf, Sep. 29, 2019, pp. 1-14.
Li et al., Learning without Forgetting, PAMI, vol. 40, No. 12, Available Online at: https://arxiv.org/pdf/1606.09282.pdf, Feb. 14, 2017, pp. 1-13.
Li et al., Universal Style Transfer via Feature Transforms, In NIPS, Available Online at: https://arxiv.org/pdf/1705.08086.pdf, Nov. 17, 2017, pp. 1-11.
Liu et al., Deep Learning Face Attributes in the Wild, In ICCV, Available Online at: https://arxiv.org/pdf/1411.7766.pdf, Sep. 24, 2015, 11 pages.
Liu et al., Few-Shot Unsupervised Image-to-Image Translation, In ICCV, Available Online at: https://arxiv.org/pdf/1905.01723.pdf, Sep. 9, 2019, pp. 1-20.
Lopez-Paz et al., Gradient Episodic Memory for Continual Learning, In NIPS, Available Online at: https://arxiv.org/pdf/1706.08840.pdf), Nov. 4, 2017, pp. 1-17.
Ly et al., A Tutorial on Fisher Information, Journal of Mathematical Psychology, vol. 80, Available Online at: https://arxiv.org/pdf/1705.01064.pdf, Oct. 17, 2017, pp. 1-59.
Nichol et al., On First-Order Meta-Learning Algorithms, Available Online at: arXiv preprint arXiv:1803.02999, Oct. 22, 2018, pp. 1-15.
Noguchi et al., Image Generation from Small Datasets via Batch Statistics Adaptation, In ICCV, Available Online at: https://arxiv.org/pdf/1904.01774.pdf, Oct. 23, 2019, 12 pages.
Qiao et al., Ancient Painting to Natural Image: A New Solution for Painting Processing, In WACV, Available Online at: https://arxiv.org/pdf/1901.00224.pdf, Mar. 29, 2019, 10 pages.
Radford et al., Unsupervised Representation Learning with Deep Convolutional Generative Adversarial Networks, Available Online at: arXiv preprint arXiv:1511.06434, Jan. 7, 2016, pp. 1-16.
Reed et al., Few-Shot Autoregressive Density Estimation: Towards Learning to Learn Distributions, Available Online at: arXiv preprint arXiv:1710.10304, Feb. 28, 2018, pp. 1-11.
Rezende et al., One-Shot Generalization in Deep Generative Models, Available Online at: arXiv preprint arXiv:1603.05106, May 25, 2016, 10 pages.
Rossler et al., FaceForensics: A Large-Scale Video Dataset for Forgery Detection in Human Faces, Available Online at: arXiv preprint arXiv:1803.09179, Mar. 24, 2018, pp. 1-21.
Russakovsky et al., Imagenet Large Scale Visual Recognition Challenge, International Journal of Computer Vision, vol. 115, No. 3, Jan. 30, 2015, pp. 1-43.
Seff et al., Continual Learning in Generative Adversarial Nets, Available Online at: arXiv preprint rXiv:1705.08395, May 23, 2017, 9 pages.
Serra et al., Overcoming Catastrophic Forgetting with Hard Attention to the Task, Available Online at: arXiv preprint arXiv:1801.01423, May 29, 2018, 17 pages.
Snell et al., Prototypical Networks for Few-Shot Learning, In NIPS, Available Online at: https://arxiv.org/pdf/1703.05175.pdf, Jun. 19, 2017, 13 pages.
Taigman et al., Unsupervised Cross-Domain Image Generation, Available Online at: arXiv preprint arXiv:1611.02200, Nov. 7, 2016, pp. 1-14.
Vinyals et al., Matching Networks for One Shot Learning, In NIPS, Available Online at: https://arxiv.org/pdf/1606.04080.pdf, Dec. 29, 2017, 12 pages.
Wang et al., CNN-Generated Images are Surprisingly Easy to Spot . . . for Now, In CVPR, Available Online at: https://arxiv.org/pdf/1912.11035.pdf, Apr. 4, 2020, pp. 1-13.
Wang et al., MineGAN: Effective Knowledge Transfer from GANs to Target Domains with Few Images, In CVPR, Available Online at: https://arxiv.org/pdf/1912.05270.pdf, Apr. 2, 2020, 19 pages.
Wang et al., Transferring GANs: Generating Images from Limited Data, In ECCV, Available Online at: https://arxiv.org/pdf/1805.01677.pdf, Oct. 2, 2018, 22 pages.
Wu et al., Memory Replay GANs: Learning to Generate New Categories without Forgetting, In NIPS, Available Online at: https://arxiv.org/pdf/1809.02058.pdf, Sep. 23, 2019, 12 pages.
Yaniv et al., The Face of Art: Landmark Detection and Geometric Style in Portraits, ACM Transactions on Graphics (TOG), vol. 38, No. 4, Jul. 2019, pp. 1-15.
Zenke et al., Continual Learning Through Synaptic Intelligence, In ICML, Available Online at: http://proceedings.mlr.press/v70/zenke17a/zenke17a.pdf, 2017, 9 pages.
Zhai et al., LifeLong GAN: Continual Learning for Conditional Image Generation, In ICCV, Available Online at: https://arxiv.org/pdf/1907.10107.pdf, Aug. 22, 2019, 10 pages.
Zhang et al., The Unreasonable Effectiveness of Deep Features as a Perceptual Metric, In CVPR, Available Online at: https://arxiv.org/pdf/1801.03924.pdf, Apr. 10, 2018, pp. 1-14.

(56) References Cited

OTHER PUBLICATIONS

Zhu et al., Toward MultiModal Image-to-Image Translation, In NIPS, Available Online at: https://arxiv.org/pdf/1711.11586.pdf, Oct. 24, 2018, 12 pages.
Zhu et al., Unpaired Image-to-Image Translation Using Cycle-Consistent Adversarial Networks, In ICCV, Available Online at: https://arxiv.org/pdf/1703.10593.pdf, Aug. 24, 2020, pp. 1-18.

* cited by examiner

FEW-SHOT IMAGE GENERATION VIA SELF-ADAPTATION

TECHNICAL FIELD

This disclosure generally relates to image enhancement and, more specifically, to automatically enhancing images using an adaptive model. The adaptive model transforms image content into an adapted representation of the image content, having a target style, using few-shot image generation.

BACKGROUND

Image processing systems are used for providing various types of enhanced, altered, or modified images by end users who interact with image content. Image processing systems use a number of image capture devices, databases, or other repositories to provide image content. For instance, end users use cameras in mobile devices to capture images of themselves (e.g., selfies) or their surrounding environment. While consumer devices have made capturing images easier, many end users seek to enhance their image content.

SUMMARY

Certain aspects involve methods, systems and non-transitory computer-readable mediums having instructions stored thereon for generating adapted representations of images using a machine learning model. In an illustrative example, an image processing system generates adapted representations of images that more closely match a target style of a small domain of images using few-shot image generation. More specifically, the image processing system receives a request to transform an input image into a target image. The image processing system provides the input image to a machine learning model that is trained to adapt images. Further, training the machine learning model includes accessing training data having a source domain that includes source images and a target domain that includes a limited number of artistic images. The target domain includes a target style. Training the machine learning model also involves using a pre-trained generative model to generate an adapted source domain of adapted images that includes the target style. The adapted source domain is generated by determining a rate of change for parameters associated with the target style, generating weighted parameters by applying a weight to each of the parameters based on the rate of change, and by applying the weighted parameters to the source domain. Additionally, the image processing system uses the machine learning model to generate the target image by modifying parameters associated with the input image, for example, using the target style.

Other aspects describe training a machine learning model to match a target style of a small domain of images using few-shot image generation. For instance, one example method involves a processing device accessing training data, which includes a source domain having source images and a target domain having a limited number of artistic images in a target style. The processing device performs a step for generating an adapted source domain that includes adapted images in the target style. In addition, the processing device outputs a machine learning model that applies the target style to an input image using the adapted source domain.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of this disclosure are better understood when the following Detailed Description is read with reference to the drawings.

DETAILED DESCRIPTION

Figure 1:
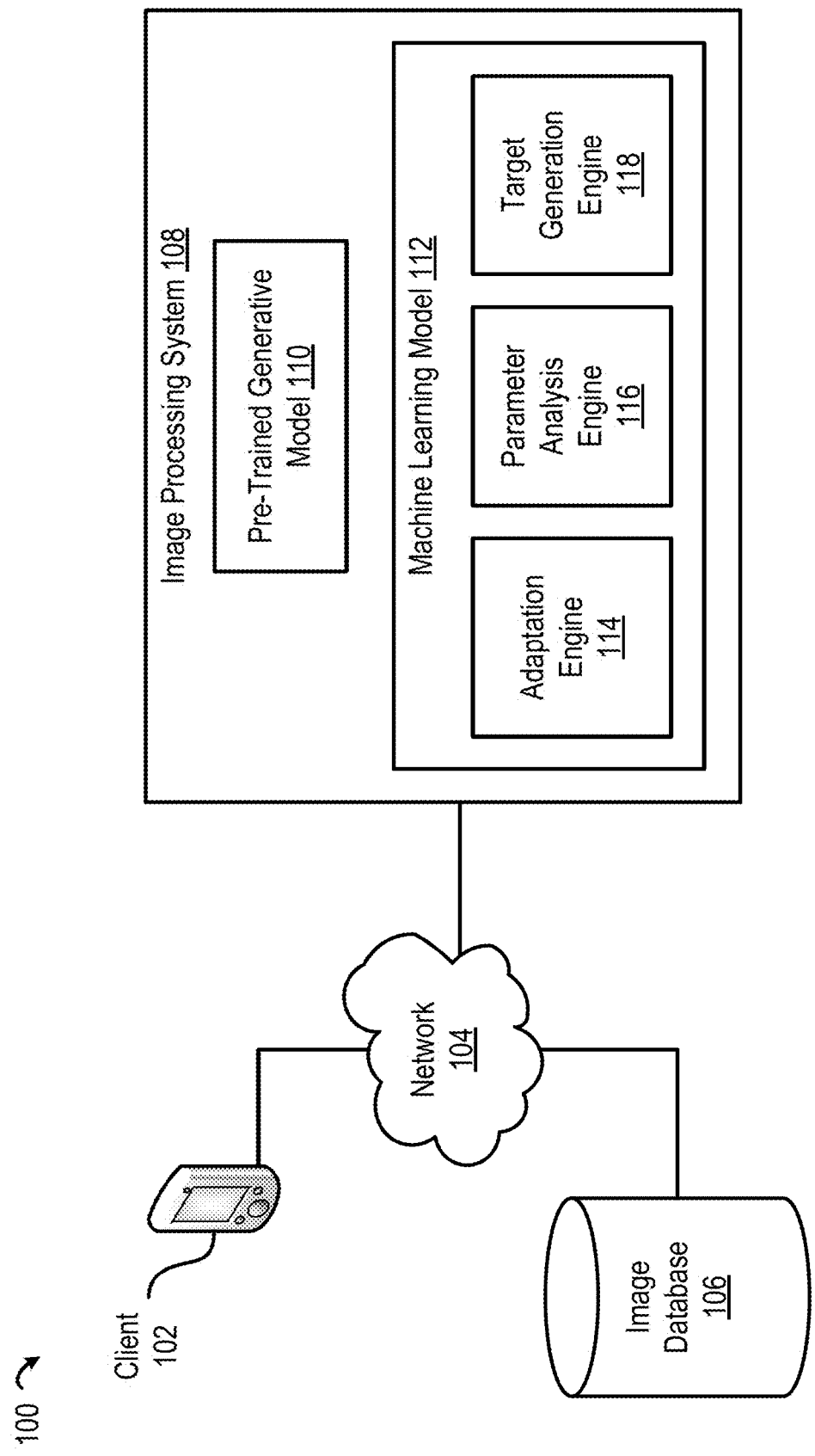
FIG. 1 depicts an example of a computing environment for few-shot image generation via self-adaptation, according to certain aspects of this disclosure.

Certain aspects involve using a machine learning model to perform few-shot image generation via self-adaptation by adapting a pre-trained generative model using applied weights during supervised learning. Conventional solutions that employ few-shot machine learning are typically limited to labelling or other classification tasks. Some conventional solutions include computer-based methods that use few-shot techniques to learn a classifier using a limited number of identified examples (e.g., labels). Other computer-based methods include models that seek to use few-shot techniques to produce image content.

But existing computer-based models that have sought to generate image content with few-shot techniques typically produce suboptimal results. For example, some existing computer-based models limit the number of parameters that are transferred to only include either a color and/or a texture. In addition, some existing computer-based models generates image content that is over-fitted to one or more of the limited number of few-shot examples. For example, some existing computer-based models suffer from over-fitting by producing image content that looks extremely similar to or exactly like one or more training examples, rather than generating image content that maintains diversity from previous examples. Preserving diversity when producing image content ensures that generated image content includes a sufficient amount of adaptation to reflect an aesthetically-recognizable style, while creating imagery from learned variations that do not appear like a copy of a training example.

While consumer devices have made capturing images easier, many end users would benefit from an ability to enhance their image content without these drawbacks. Certain aspects described herein address these issues by, for example, generating an adapted representation of an image using a machine learning model. For example, certain aspects described herein generate adapted images that more closely match a target style of a small domain of images using few-shot image generation. The following non-limiting examples are provided to introduce certain aspects of this disclosure.

In one example, an image processing system facilitates few-shot image generation using self-adaptation by receiving an input with an input image (e.g., a request, user input, button press, graphical user interface (GUI) selection, text input, speech-to-text input, gesture, etc.) to generate a target image. The image processing system provides the input image to a self-supervised machine learning model that has been trained to adapt images (e.g., real images, photographs, video images, realistic graphical images, etc.) into target images (e.g., having a particular target style). The machine learning model transforms the input image into a target image in the target style by modifying parameters associated with the input image. As a result, the machine learning model enhances an overall quality level, e.g., by generating a target image that includes a desired aesthetic or imaging effect. In some examples, the machine learning model creates virtual characters or avatars in a likeness of a user that is adapted to an aesthetic or overall appearance that is native to or associated with a virtual environment.

In some examples, the machine learning model is trained using a source domain, which includes source images and a target domain, which includes a limited number of artistic images. The target domain includes a target style. Training the machine learning model further includes using a pre-trained generative model to generate an adapted source domain that includes a set of adapted images. The set of adapted images include the target style. The adapted source domain is generated by determining a rate of change for each of a set of parameters associated with the target style, generating a set of weighted parameters by applying a weight to each of the set of parameters based on the rate of change, and by applying the set of weighted parameters to the source domain.

In another example, a machine learning model is trained by adapting a pre-trained generative model. For instance, the machine learning model adapts a pre-trained generative model that is pre-trained using a large source domain of source images. In this example, the pre-trained generative model is pre-trained to generate facial images based on a large quantity of source images. The pre-trained generative model uses an adversarial framework to identify shared parameters in the source images, for example, by applying an adversarial loss.

In some examples, the shared parameters associated with source images are conditionally adapted to provide estimation parameters for inferring adapted images in a particular style. Further, the pre-trained generative model includes a generative model, a discriminative model, or an adversarial model. And in some examples, the pre-trained generative model is a generative adversarial network (GAN).

In this example, the machine learning model adapts the pre-trained generative model using few-shot generation via self-adaptation. For instance, the machine learning model is trained to adapt source images into a target style. In this example, training the machine learning model includes determining the target style using few-shot generation (e.g. a limited number of example images) that are obtained from a target domain. To do so, the machine learning model generates additional data (e.g., training images) by adapting the estimation parameters from the pre-trained generative model.

For example, the machine learning model uses the estimation parameters to determine weights assigned to the estimation parameters by determining an importance factor for each estimation parameter. The machine learning model determines the importance factors by computing an importance measure using a scoring function (e.g., Fisher information). The machine learning model balances different losses against the Fisher information by applying a regularization loss to each of the estimation parameters. Further, the machine learning model applies an elastic weight consolidation (EWC) loss to the estimation parameters to avoid overfitting. In some examples, training the machine learning model includes combining an output of the pre-trained generative model using regularized importance factors.

Certain aspects provide improvements over existing software tools for editing imagery. For instance, the machine learning model described herein takes advantage of the benefits that stem from using few-shot images, while avoiding many of the pitfalls of existing solutions. Among the benefits of using few-shot images, there is a reduction in the overall costs associated with obtaining a sufficient amount of training data. In addition, since the machine learning model creates additional training images using a pre-trained model, less computations are required of the machine learning model because the machine learning model applies self-adaptation techniques to an existing set of parameters, e.g., obtained from the pre-trained model. By leveraging parameters from the pre-trained model, the machine learning model has an ability to generate imagery that more closely reflects a desired target style.

For example, images generated by the machine learning model includes both low-level parameters (e.g., global colors and/or textures), as well as high-level parameters that capture fine details of a specified target style. Thus, the machine learning model generates imagery at a reduced cost, with greater computational efficiency, and while preserving a diverse set of aesthetic characteristics learned from the pre-trained model. Moreover, the machine learning model avoids typical pitfalls of existing models, which frequently result in suboptimal imagery that is often blurry, out-of-focus, suffers from mode collapse, are over-fitted, and are less aesthetically pleasing overall.

Example of a Computing Environment for Few-Shot Image Generation Via Self-Adaptation Referring now to the drawings, FIG. 1 depicts an example of a computing environment 100 for few-shot image generation via self-adaptation, according to certain aspects of this disclosure. In the example of a computing environment 100 depicted in FIG. 1, various client devices 102 access an image processing system 108 via a data network 104. In some aspects, as in the example of a computing environment 100, the image processing system 108 includes a pre-trained generative model 110 and a machine learning model 112. In additional or alternative aspects, the pre-trained generative model 110 and machine learning model 112 could be implemented in separate, independently operated computing systems.

The image processing system 108 includes one or more devices that provide and execute one or more modules, engines, applications, etc. for providing one or more digital experiences to the user. In some aspects, the image processing system 108 includes one or more processing devices, e.g., one or more servers, one or more platforms with corresponding application programming interfaces, cloud infrastructure, and the like. In addition, some engines are implemented using one or more servers, one or more platforms with corresponding application programming interfaces, cloud infrastructure, and the like. The image processing system 108 uses the one or more processing devices to execute suitable program code for performing one or more functions. Examples of this program code include software components depicted in FIG. 1, such as the machine learning model 112, adaptation engine 114, parameter analysis engine 116, and target generation engine 118.

The image processing system 108 uses one or more of these engines to receive an input that includes an input image. As described in detail with respect to the various examples below, the image processing system 108 uses a trained machine learning model 112 to transform the input image into a desired target style. In some examples, the machine learning model 112 executes the target generation engine 118 to transform the input image into the target style. In some aspects, the image processing 108 automatically generates produced image content in response to an input image.

In some aspects, the image processing system 108 trains the machine learning model 112. For example the computing environment 100 depicted in FIG. 1, shows the image processing system 108 including machine learning model 112. The machine learning model 112 is trained using one or more suitable deep learning techniques. Examples of suitable deep learning techniques include techniques using a deep neural network (DNN) (e.g., a feed-forward neural network (FNN), a multilayer perceptron (MLP), a recurrent neural network (RNN), long-short term memory network (LSTM), independent RNN (IndRNN), etc.), a convolutional neural network (e.g., a region convolutional neural network ("R-CNN"), Fast R-CNN, or Faster R-CNN), a deep residual network (e.g., ResNet-101), etc.

In some examples, the machine learning model 112 includes a GAN, BigGAN, LapGAN, MineGAN, StyleGAN, or a deep convolutional generative adversarial network (DCGAN). In one example, the machine learning model 112 is a five-layer DCGAN. And in the example shown in FIG. 1, the machine learning model 112 includes the adaptation engine 114, the parameter analysis engine 116, and the target generation engine 118.

In some aspects, the image processing system 108 retrieves a corpus of training data from an image database 106 (e.g., a source domain and a target domain). In one example, the image processing system 108 trains the machine learning model 112 using the training data. For example, the image processing system 108 uses a pre-trained generative model (e.g., pre-trained generative model 110) to generate an abundant amount of training data in the form of a source domain of source images. The machine learning model 112 accesses the corpus of training data, for example, by obtaining the source domain from the pre-trained generative model 110. In some examples, the machine learning model 112 executes the adaptation engine 114 to adapt features from source images in the source domain.

In some examples, the source domain includes a type of training data or a training dataset that is input into the machine learning model 112 to train the machine learning model 112. In one example, the source domain includes a corpus of source images. In some examples, the source domain provides an abundant dataset having a large quantity of source images. Further, source domains include one or more shared characteristics, classifications, resolutions, semantic relationships, types, etc. For instance, in some examples, the source domain includes human faces, natural landscapes, and/or a particular resolution.

Likewise, the target domain is another type of training data or a training dataset that is input into the machine learning model 112 to train the machine learning model 112. In one example, the target domain includes a corpus of target images. In some examples, the target domain provides a limited dataset having a small quantity of target images. The target domain includes a target style that has a particular set or subset of distinctive visual features. For example, some target domains include target images with a target style that includes an artistic style such as cubism, gothic, modern, neoclassic, pop, realism.

In other examples, the artistic style includes a type or collection of artistic characters, such as avatars, Bitmojis™ emojis, game characters, virtual reality (VR) characters, or augmented reality (AR) characters, etc. In some examples, the artistic style includes a collection of artistic works from a single artisan. The target domain also includes shared characteristics, classifications, resolutions, semantic relationships, or types, etc. The target style includes one or more parameters that are aesthetically identifiable or otherwise visually associated with the few-shot images (e.g., an artistic collection).

The machine learning model 112 is trained to adapt source images into a target style. The machine learning model 112 is trained by adapting the pre-trained generative model 110. For instance, the machine learning model 112 adapts the pre-trained generative model 110 that is pre-trained using a source domain of source images from image database 106.

The pre-trained generative model 110 is trained to generate facial images using the source domain. In some examples, pre-trained generative model 110 uses a StyleGAN network architecture.

In one example, the pre-trained generative model 110 uses an adversarial framework to identify shared parameters in the source images. For example, the pre-trained generative model 110 identifies parameters by applying an adversarial loss. In this example, the pre-trained generative model 110 computes adversarial loss using the following expression.

$$L_{adv} = \min_{G} \max_{D} \varepsilon_{x \sim P_{data}(x)}[\log D(x)] + \varepsilon_{z \sim P_z(z)}[\log(1 - D(G(z)))]$$

Here, $L_{adv}$ represents the adversarial loss, G represents a generator for the pre-trained generative model 110, D represents a discriminator for the pre-trained generative model 110, $$L'_{adv} = \min_{G'} \max_{D'} \varepsilon_{x \sim P_{data}(x)}[\log D'(x)] + \varepsilon_{z \sim P_z(z)}[\log(1 - D'(G'(z)))]$$

represents a minmax value function for G and D, $\varepsilon_{x \sim P_{data}(x)}$ represents an expected value over all real data instances (e.g., $x \sim P_{data}(x)$), $\varepsilon_{z \sim P_z(z)}$ represents an expected value over all random inputs to the generator G (e.g., $z \sim P_z(z)$), $P_{data}(x)$ represents a distribution of noise associated with a subset of source images from the source domain, and $P_z(z)$ represents a distribution of noise among a set of parameters of the source domain.

Training the machine learning model 112 includes generating additional training data. Further, the machine learning model 112 determines a target style of the target domain. For example, machine learning model 112 uses the adaptation engine 114 to generate additional data (e.g., abundant training images) by adapting the set of parameters associated with the source domain. And in this example, the machine learning model 112 adapts the pre-trained generative model 110 using few-shot generation via self-adaptation.

For instance, the machine learning model 112 executes the adaptation engine 114 that also uses an adversarial framework to identify the target style, e.g., which includes shared parameters among the target images. Specifically, the adaptation engine 114 fine-tunes the pre-trained generative model 110 by applying an adversarial loss to the source domain in a style of the target domain to generate more training data. Like the pre-trained generative model 110, the adaptation engine 114 computes the adversarial loss using the following expression.

$$\min_{G} \max_{D}$$

But here, $L'_{adv}$ represents the adversarial loss, $$\min_{G'} \max_{D'}$$

represents a minmax value function for G' and D', $\varepsilon_{x \sim P_{data}(x)}$ represents an expected value produced over all real data instances (e.g., $x \sim P_{data}(x)$), $\varepsilon_{z \sim P_z(z)}$ represents an expected value over all random inputs to the generator (e.g., $z \sim P_z(z)$), G' represents a generator associated with an adapted generative model produced by the adaptation engine 114, D' represents a discriminator that is associated with the adaptation engine 114, $P_{data}(x)$ represents a distribution of noise associated with the few-show, limited number of target images (e.g., the target domain), and $P_z(z)$ represents a distribution of noise for a set of parameters associated with the target domain. The adaptation engine 114 generates adapted images with diversity preserved from the source images, e.g., that include an overall aesthetic appearance that is substantially similar to the target style. The adaptation engine 114 provides the adapted images to the parameter analysis engine 116.

The machine learning model 112 executes the parameter analysis engine 116, which obtains the adapted images from the adaptation engine 114. For example, the parameter analysis engine 116 uses parameters from the pre-trained generative model 110 and the adaptation engine 114 to determine an average rate of change for weights assigned to the parameters. The parameter analysis engine 116 analyzes weights assigned to parameters associated with source domain and parameters associated with the target domain using data from the pre-trained generative model 110 and the adaptation engine 114, respectively. In some examples, the machine learning model 112 executes the parameter analysis engine 116 in tandem (e.g., substantially simultaneously) with the adaptation engine 114.

For instance, the parameter analysis engine 116 determines the average rate of change for weights assigned to the parameters using the following expression.

$$\Delta = \frac{1}{N} \sum_i \frac{|\theta_{G',i} - \theta_{G,i}|}{\theta_{G,i}} \times 100\%$$

Here, G is obtained from pre-trained generative model 110, G' is obtained from the adaptation engine 114, N represents a number of parameters, $\theta_{G,i}$ represents an i-th parameter in the model G, and $\theta_{G',i}$ represents an i-th parameter in the adapted model G' provided by the adaptation engine 114. In some examples, the parameter analysis engine 116 computes the average rate of change for the weights for each parameter at each convolutional layer.

The machine learning model 112 also uses the parameter analysis engine 116 to determine an importance factor for each estimation parameter. For instance, the parameter analysis engine 116 estimates an overall importance of parameters using learned values. The parameter analysis engine 116 determines the importance factors by computing an importance measure using a scoring function (e.g., by calculating Fisher information). In one example, the parameter analysis engine 116 computes the Fisher information F for learned values of parameters $\theta_s$ using the following expression.

$$F = E\left[-\frac{\partial^2}{\partial \theta_s^2} \mathcal{L}(X|\theta_s)\right]$$

Here, $\mathcal{L}(X|\theta_s)$ is a log-likelihood function that is a computational equivalent of a binary cross-entropy loss, e.g., using an output of a discriminator, where $\theta_s$ represents the learned values of weights of parameters from the pre-trained generative model 110 G, and X represents an amount of generative training images that is based on the learned values $\theta_s$.

The machine learning model 112 balances different losses against the Fisher information by applying a regularization loss to each of the estimation parameters. For instance, the parameter analysis engine 116 uses the Fisher information F calculated above to determine a regularization loss. Further, the parameter analysis engine 116 applies the regularization loss to penalize a weight change that occurs during an adaptation to a target domain. To do so, the parameter analysis engine 116 uses the following expression.

$$L_{adapt} = L_{adv} + \lambda \sum_i F_i(\theta_i - \theta_{S,i})^2$$

Here, $L_{adapt}$ represents the regularization loss, which is an adaptation loss that includes the adversarial loss described above (e.g., $L_{adv}$), $F_i$ represents a Fisher information matrix, $\theta$ represents values for parameters of the target style, $\theta_s$ represents the learned values of weights of parameters from the pre-trained generative model 110 G, and $\lambda$ represents a regularization weight that balances various losses, and the entire term $\lambda \Sigma_i F_i(\theta_i - \theta_{S,i})^2$ represents an EWC loss, which is applied to parameters to avoid overfitting.

Some aspects of the computing environment 100 include client devices 102. For instance, some client devices 102 are operated by client entities (e.g., commercial entities or content providers) that request a transformation of images using techniques discussed herein. Such requests are performed by sending images directly to the image processing system 108. In another example, the client devices 102 are operated by end users that desire to enhance various image content of interest. For instance, end users send requests for a transformation of an image, collection of images, video, vlog, selfie, or social media story, etc.

Examples of a client device 102 include, but are not limited to, a personal computer, a laptop, a tablet, a desktop, a server, a mobile device, a smartphone, a processing unit, any combination of these devices, or any other suitable device having one or more processors. A user of a client device 102 uses various products, applications, or services supported by the image processing system 108 via the data network 104.

Each of the client devices 102 is communicatively coupled to the image processing system 108 via the data network 104. Examples of the data network 104 include, but are not limited to, internet, local area network ("LAN"), wireless area network, wired area network, wide area network, and the like.

In the example of the computing environment 100, the image processing system 108 depicted in FIG. 1 executes the machine learning model 112 to generate target images. The image processing system 108 outputs the target images to a requesting client device 102. In one example, outputting target images includes encoding and transmitting the target image to the client device 102. In some examples, the image processing system 108 encodes the target image using any suitable image format (e.g., AVI, BGP, BMP, CGM, Exif, FLV, F4V, GIF, HDR, HEIF, HEVC, JPEG, MPEG, MP4, PNG, PPM, RIFF, SVG, TIFF, VC-1, VVC, WebP, XPS, or any other suitable imaging format). In other examples, outputting the target image includes electronic storage on a memory associated with the computing environment 100.

Examples of Processes for Few-Shot Image Generation Via Self-Adaptation

Figure 2:
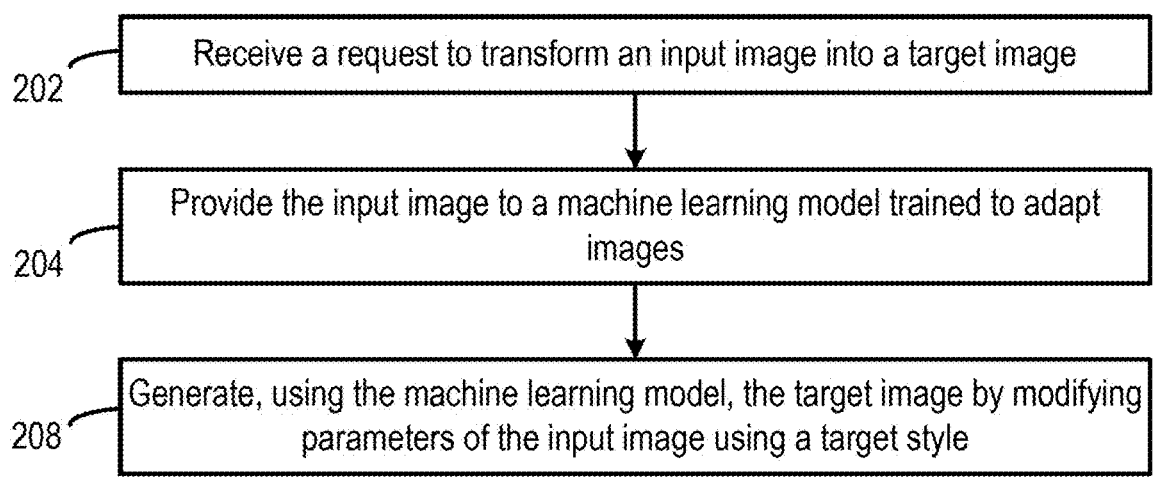
FIG. 2 depicts an example of a process for transforming an input image into a target image using few-shot image generation via self-adaptation, according to certain aspects of this disclosure.

FIG. 2 is an example of a process 200 for transforming an input image into a target using few-shot image generation via self-adaptation, according to certain aspects of this disclosure. One or more operations described with respect to FIG. 2 transform an input image using an image processing system (e.g., image processing system 108). The image processing system 108 executes a trained machine learning model (e.g., machine learning model 112) to produce target images according certain aspects discussed herein. One or more processing devices (e.g., computing environment 100) implement operations depicted in FIG. 2 by executing suitable program code (e.g., machine learning model 112). For illustrative purposes, the process 200 is described with reference to certain examples depicted in the figures. Other implementations, however, are possible.

At block 202, the process 200 involves receiving a request to transform an input image into a target image. Examples of received requests are described in further detail below with respect to FIG. 9. In one example, image processing system 108 receives a request to transform the input image from a client device (e.g., client device 102). The request to transform the input image is sent from any of the client devices 102 described above.

In some examples, a user of the client device 102 requests transformation of an input image that includes a desired target style. Further, the target style includes a particular artistic style. In some examples, the input image is a real image (e.g., a photograph). In one example, the client device 102 sends a request to transform an input image that is stored locally at the client device 102 or remotely (e.g., at an image database 106). The request for transformation of the input image includes generating a target image based on the input image. In some examples, the target image includes a graphical representation of the input image.

For instance, the request from the client device 102 includes a captured image (e.g., a photograph captured by a camera integrated in the client device 102). The request is entered in an application being executed on the client device 102 (e.g., via a GUI). In some examples, the application allows a user to select a desired target style from a list or menu of available target styles. For example, the client device 102 sends a request to transform a captured image of a self-portrait (e.g., a selfie) into a desired target style. In this example, the desired target style includes an avatar, Bitmoji™ emoji, game character, VR character, AR character, or another desired artistic target style.

At block 204, the process 200 involves providing the input image to the trained machine learning model 112 that is trained to adapt images. For instance, the image processing system 108 sends the input images to the machine learning model 112. The image processing system 108 executes the machine learning model 112, which is trained to adapt images according to any of the techniques described herein. The machine learning model 112 identifies parameters associated with the input image and target style. For example, the machine learning model 112 determines parameters shared by the input image and target style.

At block 206, the process 200 involves generating, using the trained machine learning model 112, the target image by modifying one or more parameters of the input image using a target style. For example, the trained machine learning model 112 generates the target image using any of the techniques described herein. In some examples, the target image is a graphical representation of the image. For instance, the trained machine learning model 112 generates a graphical representation that includes one or more shared characteristics based on parameters associated with the input image and the target style, e.g., target parameters of a target domain.

In some examples, the graphical representation includes an avatar, Bitmoji™ emoji, game character, virtual character, AR character, landscape, still life, impression, wildlife, animal, portrait, etc. And in some examples, the trained machine learning model 112 provides the target image to image processing system 108 or the client device 102. For instance, the client device 102 receives the target image in response to the request. Further, the client device 102 renders the target image on a display, for example, using the application described above. In other examples, the trained machine learning model 112 outputs the target to a non-display device such as the image database 106.

Figure 3:
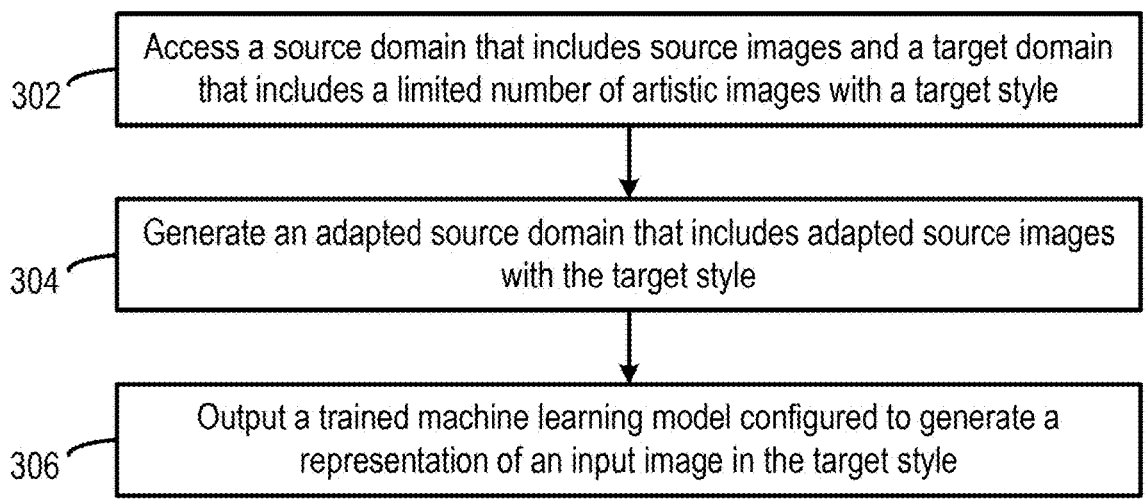
FIG. 3 depicts an example of a process for training a machine learning model to generate adapted images, e.g., as described in FIG. 2, by transforming source images using few-shot image generation via self-adaptation, according to certain aspects of this disclosure.

FIG. 3 is an example of a process 300 for training a machine learning model to generate adapted images, e.g., by transforming source images using few-shot image generation via self-adaptation, according to certain aspects of this disclosure. Operations described with respect to FIG. 3 transform source images using an image processing system (e.g., image processing system 108). The image processing system 108 executes a trained machine learning model (e.g., machine learning model 112) to produce adapted images with a target style according certain aspects discussed herein. One or more processing devices (e.g., computing environment 100) implement operations depicted in FIG. 3 by executing suitable program code (e.g., machine learning model 112). For illustrative purposes, process 300 is described with reference to examples depicted in the figures; however, other implementations are possible.

At block 302, the process 300 involves accessing a source domain that includes source images and a target domain that includes a limited number of artistic images with a target style. For instance, the image processing system 108 accesses the source domain that includes the source images. In some examples, the image processing system 108 accesses the source domain by requesting, retrieving, or otherwise obtaining the source domain from a remote computing device or repository such as the image database 106. Further, in some examples, the image processing system 108, pre-trained generative model 110, the machine learning model 112, or a combination of these accesses the source domain.

Figure 6:
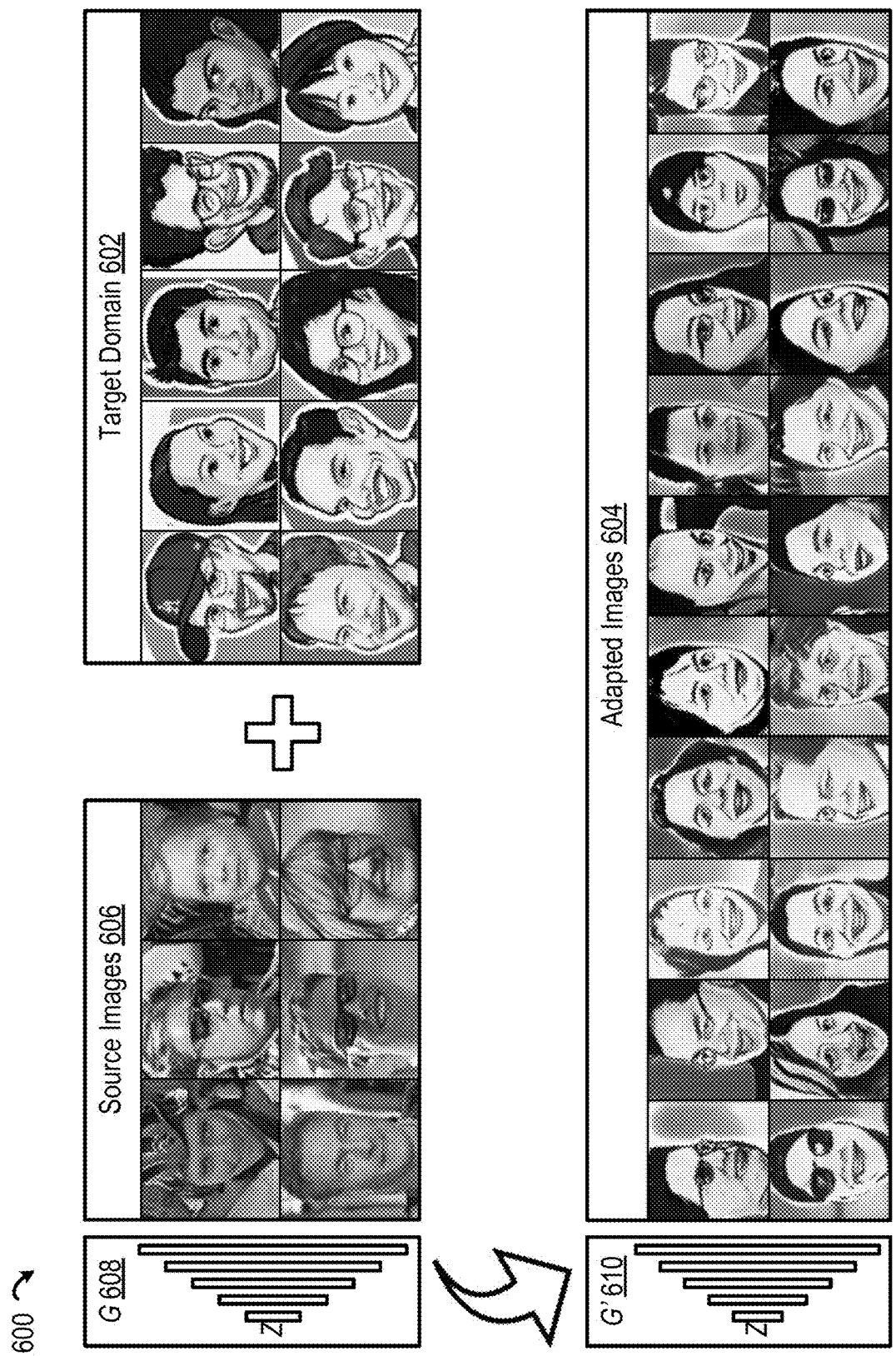
FIG. 6 depicts examples of images that are used in the processes for training a machine learning model to transform source images using few-shot image generation via self-adaptation, e.g., as described in FIGS. 3-5, and according to certain aspects of this disclosure.

As described in greater detail below, with respect to FIGS. 6 and 9, the source domain includes source images that depict a large quantity of training images. In some examples, such abundant training data is related to images contained in the target domain. In one example, the source domain is semantically related to the target domain. In another example, the source domain includes real faces that are semantically related to faces of the target domain (e.g., emoji faces, cartoon faces, or caricatures, etc.). In this example, the source domain includes faces generated using an abundant training dataset previously provided to the pre-trained generative model 110. Similarly, the image processing system 108 accesses the target domain.

In this example, the target domain includes a limited number of artistic images that share a target style. Further, the limited number of artistic images are few-shot images that are used to generate an abundant training dataset. In some examples, a number of few-shot images are limited to a predetermined threshold value. For instance, in one example, the number of few-shot images includes 10 or fewer images. The image processing system 108 provides the source domain and the target domain to the machine learning model 112. Examples of target domains that include target images having shared parameters are described in greater detail below, e.g., with respect to FIGS. 6-8, 11, and 12.

At block 304, the process 300 involves generating an adapted source domain that includes adapted images with the target style. For instance, the machine learning model 112 is trained according to any of the techniques described herein. Specifically, the machine learning model 112 uses weights that are determined based on information associated with the generated source images to adapt the pre-trained generative model 110.

For instance, the machine learning model 112 obtains weights associated with parameters identified by the pre-trained generative model 110. For example, the weights are computed during a generation of the source images, e.g., when the pre-trained generative model 110 applied an adversarial loss to the source domain. The machine learning model 112 adapts the pre-trained generative model 110 by fine-tuning these weights using data obtained from an adversarial loss that is applied to the target domain.

For instance, the machine learning model 112 determines an importance factor for each parameters. In one example, the machine learning model 112 determines the importance factors by computing Fisher information after each convolutional layer. In some examples, the machine learning model 112 applies a regularization weight to balance various losses during training. For instance, the machine learning model 112 adds a regularization loss that penalizes weight changes during the adaptation of source images to a target style of the target domain. Further, in some examples, the machine learning model 112 applies an EWC loss to the changes of the weights of each parameter during the adaptation of these parameters.

At block 306, the process 300 involves outputting a trained machine learning model (e.g., machine learning model 112) configured to generate a representation of an input image in the target style. For instance, the machine learning model 112 is outputted to and/or stored in the image processing system 108. And in some examples, the machine learning model 112 is output once a convergence point is reached. For instance, the machine learning model 112 determines that an EWC loss has reached a convergence point that is associated with each of the parameters. In some examples, the convergence point includes a threshold change in an amount or percentage of an iterative EWC loss. In additional or alternative examples, the convergence point includes an EWC loss that reflects an amount of saturation, e.g., indicating that the weights of parameters are substantially unchanged over time.

Figure 4:
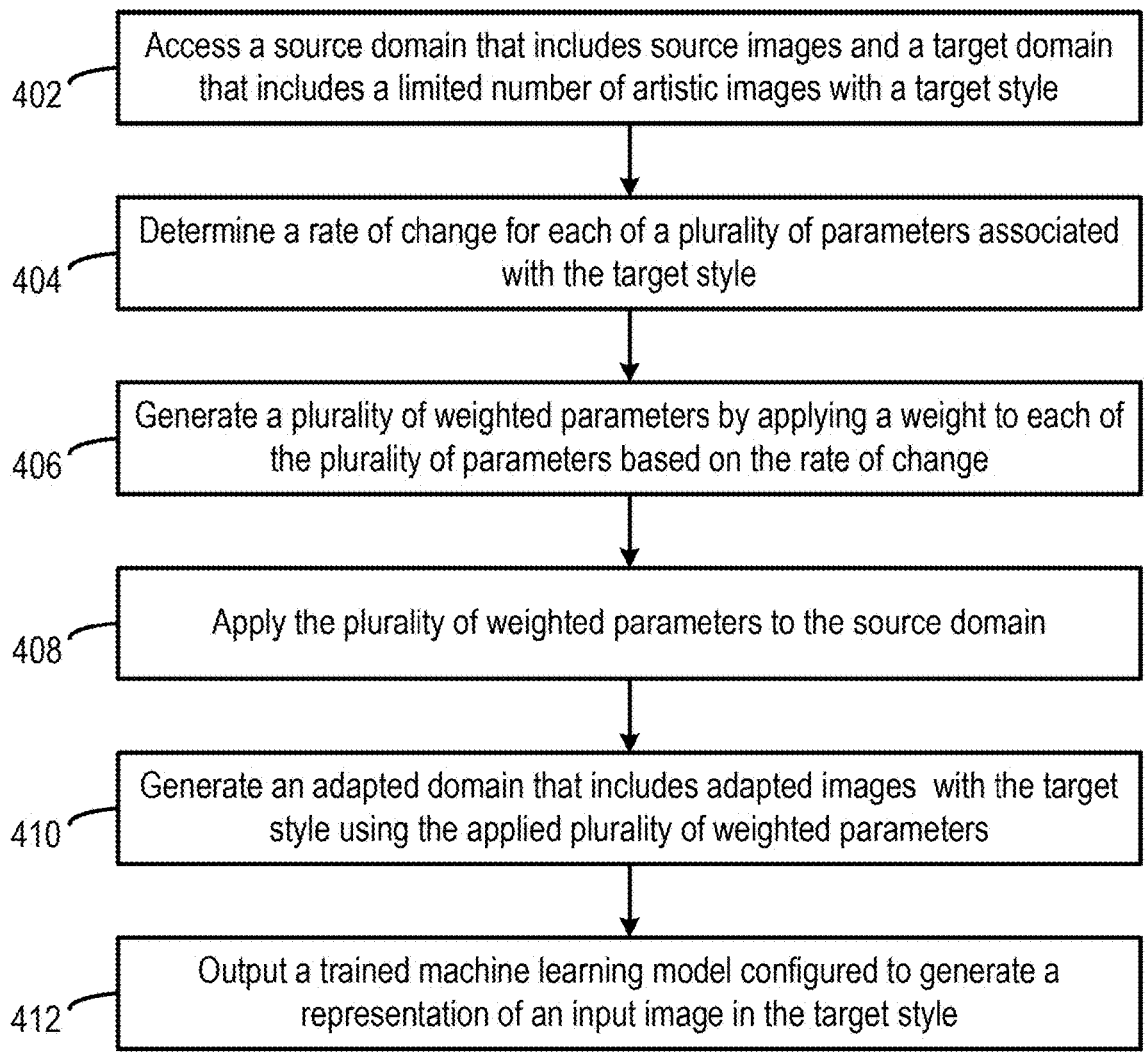
FIG. 4 depicts another example of a process for training a machine learning model to generate adapted images, e.g., as described in FIG. 2, by transforming source images using few-shot image generation via self-adaptation, according to certain aspects of this disclosure.

FIG. 4 is an example of a process 400 for training a machine learning model to generate adapted images, e.g., by transforming source images using few-shot image generation via self-adaptation, according to certain aspects of this disclosure. One or more operations described with respect to FIG. 4 transform source images using an image processing system (e.g., image processing system 108). Image processing system 108 executes a trained machine learning model (e.g., machine learning model 112) to generate adapted images with a target style according to certain aspects discussed herein. One or more processing devices (e.g., computing environment 100) implement operations depicted in FIG. 4 by executing suitable program code (e.g., machine learning model 112). For illustrative purposes, the process 400 is described with reference to certain examples depicted in the figures. Other implementations, however, are possible.

At block 402, the process 400 involves accessing a source domain that includes source images and a target domain that includes a limited number of artistic images with a target style. The image processing system 108 accesses the source domain having the source images, for example, by requesting, retrieving, or otherwise obtaining the source domain from a remote computing device or repository such as the image database 106. In some examples, the image processing system 108, pre-trained generative model 110, the machine learning model 112, or a combination of these accesses the source domain. The image processing system 108 accesses the source domain according to any of the techniques described herein.

At block 404, the process 400 involves determining a rate of change for each of a set of parameters associated with the target style. For instance, the machine learning model 112 computes Fisher information for each of the set of parameters during an adaptation to the target style. In some examples, the rate of change for each of the weights is calculated for each convolutional layer. Further, the rate of change for these parameters is calculated according to any of the techniques described herein.

At block 406, the process 400 involves generating a set of weighted parameters by applying a weight to each of the set of parameters based on the rate of change. For instance, the machine learning model 112 uses the Fisher information obtained at block 404 to generate a set of weighted parameters to be applied for each of the set of parameters during an adaptation to the target style. The machine learning model 112 does so by using the Fisher information as an importance measure or factor. For example, the Fisher information serves as a quantifiable importance factor that is selectively applied to the set of parameters as a regularization weight during an adaption to the target style. In some examples, such an importance factor is applied to each of the weighted parameters for each convolutional layer. The importance factor is used to generate or regenerate weighted parameters using any of the techniques described herein.

At block 408, the process 400 involves applying the set of weighted parameters to the source domain. For example, the machine learning model 112 balances different losses against the Fisher information obtained from block 406 by applying a regularization loss to each of the weighted parameters. For instance, the machine learning model 112 uses the Fisher information to determine the regularization loss.

The machine learning model 112 determines and applies the regularization loss to each of the weighted parameters. The regularization loss is used to penalize the rate of change determined at block 404, which occurs during an adaptation to the target style. In doing so, the machine learning model 112 preserves valuable diversity obtained from the source domain. In some examples, the machine learning model 112 applies the set of weighted parameters to the source domain according to any of the techniques described herein.

At block 410, the process 400 involves generating an adapted source domain that includes adapted images with the target style using the applied set of weighted parameters. For instance, the machine learning model 112 uses the applied weights from block 408 to adapt source images of the source domain, transforming the source images into adapted images. In some examples, the machine learning model 112 generates the adapted source domain using any of the techniques described herein.

At block 412, the process 400 involves outputting a trained machine learning model (e.g., machine learning model 112) configured to generate a representation of an input image in the target style. For instance, the machine learning model 112 is outputted to and/or stored in the image processing system 108. And in some examples, the machine learning model 112 is output once a convergence point is reached. For instance, the machine learning model 112 determines that an EWC loss has reached a convergence point that is associated with each of the parameters. In some examples, the convergence point includes a threshold change in an amount or percentage of an iterative EWC loss. In additional or alternative examples, the convergence point includes an EWC loss that reflects an amount of saturation, e.g., indicating that the weights of parameters are substantially unchanged over time.

Figure 5:
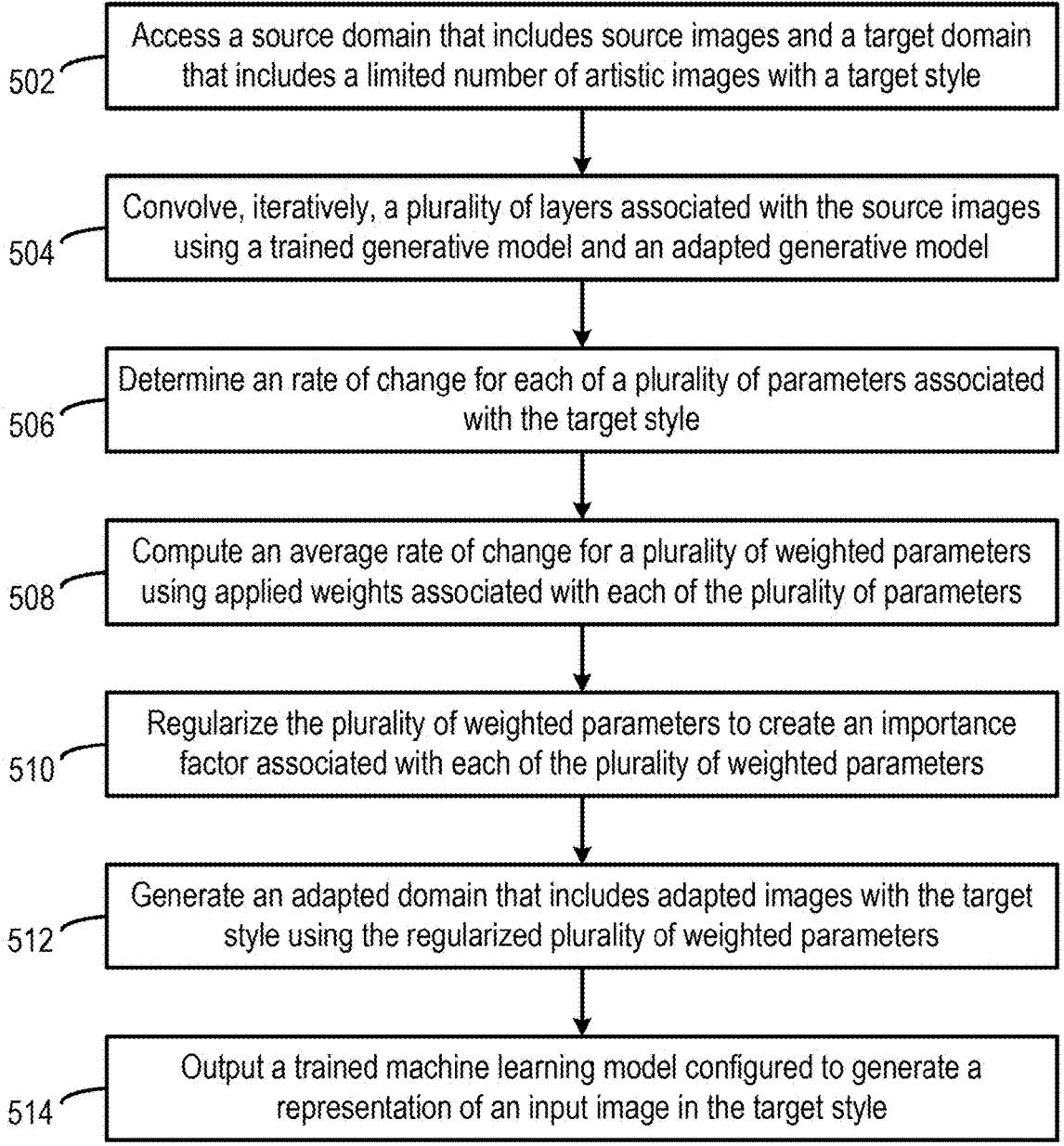
FIG. 5 depicts yet another example of a process for training a machine learning model to generate adapted images, e.g., as described in FIG. 2, by transforming source images using few-shot image generation via self-adaptation, according to certain aspects of this disclosure.

FIG. 5 is another example of a process 500 for training a machine learning model to generate adapted images, e.g., by transforming source images using few-shot image generation via self-adaptation, according to certain aspects of this disclosure. Operations described with respect to FIG. 5 transform source images using an image processing system (e.g., image processing system 108). The image processing system 108 executes a trained machine learning model (e.g., machine learning model 112) to produce adapted images with a target style according certain aspects discussed herein. One or more processing devices (e.g., computing environment 100) implement operations depicted in FIG. 5 by executing suitable program code (e.g., machine learning model 112). For illustrative purposes, the process 500 is described with reference to certain examples depicted in the figures. Other implementations, however, are possible.

At block 502, the process 500 involves accessing a source domain that includes source images and a target domain that includes a limited number of artistic images with a target style. The image processing system 108 accesses the source domain having the source images, for example, by requesting, retrieving, or otherwise obtaining the source domain from a remote computing device or repository such as the image database 106. In some examples, the image processing system 108, pre-trained generative model 110, the machine learning model 112, or a combination of these accesses the source domain. The image processing system 108 accesses the source domain according to any of the techniques described herein.

At block 504, the process 500 involves convolving, iteratively, a set of layers associated with the source images using a pre-trained generative model and an adapted generative model. The machine learning model 112 gradually adapts features and/or parameters associated with the source images over time, e.g., using a set of convolutional layers. For example, machine learning model 112 convolves each layer by applying one or more weighted parameters to the source domain provided by the pre-trained generative model. The machine learning model 112 uses the iterative convolutional adaptation to fine-tune weighted parameters using a distribution of noise variables associated with the target domain.

At block 506, the process 500 involves determining a rate of change for each of a set of parameters associated with the target style. For instance, the machine learning model 112 computes Fisher information for each of the set of parameters during an adaptation to the target style. In some examples, the rate of change for each of the weights is calculated for each convolutional layer. Further, the rate of change for each of the set of parameters associated with the target style is calculated according to any of the techniques described herein.

At block 508, the process 500 involves computing an average rate of change for a set of weighted parameters using applied weights associated with each of the set of parameters. For example, the machine learning model 112 determines the average rate of change of the applied weights for each of the iterative convolutional layers. In some examples, one or more parameters are selectively omitted.

For instance, in some examples, a bias, a normalization parameter, or another selected parameter is omitted from a computation of the average rate of change. In some examples, the average rate of change for the set of weighted parameters is calculated using any of the techniques described herein.

At block 510, the process 500 involves regularizing the set of weighted parameters to create an importance factor associated with each of the set of weighted parameters. For instance, the machine learning model 112 uses the average rate of change for the weighted parameters from block 508 to generate a set of weighted parameters to be applied for each of the set of parameters during an adaptation to the target style. The machine learning model 112 does so by using the Fisher information as an importance measure or factor. For example, the Fisher information serves as a quantifiable importance factor that is selectively applied to the set of parameters as a regularization weight during an adaption to the target style. In some examples, the importance factor is applied to each weighted parameter for each convolutional layer. Further, the importance factor is used to regularize the set of weighted parameters using any of the techniques described herein.

At block 512, the process 500 involves generating an adapted source domain that includes adapted images with the target style using the regularized set of weighted parameters. For instance, the machine learning model 112 uses the regularized importance factors associated with the weighted parameters from block 510 to adapt source images into an adapted source domain of adapted images. In some examples, the machine learning model 112 generates the adapted source domain using any of the techniques described herein.

At block 514, the process 500 involves outputting a trained machine learning model (e.g., machine learning model 112) configured to generate a representation of an input image in the target style. For instance, the machine learning model 112 is outputted to and/or stored in the image processing system 108. And in some examples, the machine learning model 112 is output once a convergence point is reached. For instance, the machine learning model 112 determines that an EWC loss has reached a convergence point that is associated with each of the parameters. In some examples, the convergence point includes a threshold change in an amount or percentage of an iterative EWC loss. In additional or alternative examples, the convergence point is an EWC loss that reflects an amount of saturation, e.g., indicating that the weights of parameters are substantially unchanged over time.

Examples of Training Imagery Used for Training Model to Transform Source Images Using Few-Shot Image Generation The following example is provided to illustrate a potential application of the operations described above. FIG. 6 depicts examples 600 of images that are used in the processes for training a machine learning model to transform source images using few-shot image generation via self-adaptation, according to certain aspects of this disclosure. In particular, FIG. 6 depicts simplified examples 600 of images that are used in the process for training a machine learning model for transforming a large source domain into a target style of a target domain (e.g., target domain 602) using few-shot image generation via self-adaptation. Operations described with respect to FIG. 6 transform source images using an image processing system (e.g., image processing system 108). The image processing system 108 trains a machine learning model (e.g., machine learning model 112) to gen- erate adapted images (e.g., adapted images 604) with a target style according to certain aspects discussed herein. One or more processing devices (e.g., computing environment 100) implement operations depicted in FIG. 6 by executing suitable program code. For illustrative purposes, the example 600 is described with reference to certain examples depicted in the figures. Other implementations, however, are possible.

In this example, the source domain includes a subset of source images 606 that depict illustrative examples provided by a pre-trained generative model (e.g., via generator G 608 for a pre-trained generative model) to the machine learning model 112. Although generator G 608 is depicted as having five convolutional layers, it should be appreciated that generator G 608 includes any number of or type of convolutional layers. In some examples, the generator G 608 for a pre-trained generative model includes all of the capabilities described above, e.g., with respect to the pre-trained generative model 110 of FIG. 1.

The machine learning model 112 uses the source images 606 to generate a set of adapted images 604. For instance, the machine learning model 112 generates the set of adapted images 604 in a target style associated with the target domain 602. And in this example, the machine learning model 112 uses an adapted generator G' 610 for an adapted generative model to generate the set of adapted images 604 in the target style. While the adapted generator G' 610 is depicted having five convolutional layers, it should be appreciated that the adapted generator G' 610 also includes any suitable number of or type of convolutional layers. In some examples, the adapted generator G' 610 for the adapted generative model includes all of the capabilities described above, e.g., with respect to the adaptation engine 114 of FIG. 1.

Figure 7:
FIG. 7 depicts other examples of images that are used in the processes for training a machine learning model to transform source images using few-shot image generation via self-adaptation, e.g., as described in FIGS. 3-5, and according to certain aspects of this disclosure.
Figure 7:

FIG. 7 depicts other examples 700 of images that are used in the processes for training a machine learning model to transform source images using few-shot image generation via self-adaptation, according to certain aspects of this disclosure. In particular, FIG. 7 depicts a simplified example 700 of a diagram of training a machine learning model for transforming a source domain into a target style of a target domain using few-shot image generation via self-adaptation. One or more operations described with respect to FIG. 7 transform source images using an image processing system (e.g., image processing system 108). The image processing system 108 trains a machine learning model (e.g., machine learning model 112) to generate adapted images to provide additional training images (e.g., generated training images 704) using a target style (e.g., of few-shot image 702) according to certain aspects discussed herein. One or more processing devices (e.g., computing environment 100) implement operations depicted in FIG. 7 by executing suitable program code (e.g., machine learning model 112). For illustrative purposes, the example 700 is described with reference to certain examples depicted in the figures. Other implementations, however, are possible.

In this examples, the machine learning model 112 generates additional training images (e.g., generated training images 704) using the target style associated with a few-shot image 702. For instance, the machine learning model 112 employs an adversarial framework to identify parameters associated with the target style according to any of the techniques described herein. Further, the machine learning model 112 applies an adversarial loss to a source domain in the target style to obtain the generated training images 704. As described above, the machine learning model 112 computes the adversarial loss to generate the generated training images 704 while preserving diversity from the source images.

In this example, the machine learning model 112 uses shared parameters between the source domain and the exemplary few-shot image 702 to generate the generated training images 704 that include an aesthetic appearance of the target style. For example, the generated training images 704 include a substantially similar identity, e.g., having various aesthetic features in common with the few-shot image 702. However, the generated training images 704 also include a diverse set of variations.

For instance, some of the generated training images 704 include diversity that is reflected by a youthful overall appearance, additional accessories (e.g., glasses, raised collars, or necklaces, etc.), alterations of skin tones, differences in hairstyles (e.g., parts, bangs, gray or streaks, etc.), facial features (e.g., dimples, toothy smiles, or an eyebrow thickness, etc.), facial expressions, poses, or other variations in appearance, etc. While the generated training images 704 are depicted in FIG. 7 with respect to facial images, it should be appreciated that additional training images are generated for any suitable type of images. For instance, some generated training images 704 include landscapes, still life, impressions, wildlife, animals, or portraits, etc.

Figure 8:
FIG. 8 depicts other examples of images that are used in processes for training a machine learning model to transform source images using few-shot image generation via self-adaptation, e.g., as described in FIGS. 3-5, and according to certain aspects of this disclosure.

FIG. 8 depicts other examples 800 of images that are used in the processes for training a machine learning model to transform source images using few-shot image generation via self-adaptation, according to certain aspects of this disclosure. In particular, FIG. 8 depicts an example 800 of a diagram of training a machine learning model for transforming a large source domain into a target style of a target domain (e.g., a style associated with few-shot images 802). One or more operations described with respect to FIG. 8 transform source images using an image processing system (e.g., image processing system 108). The image processing system 108 trains a machine learning model (e.g., machine learning model 112) to generate adapted images (e.g., adapted images 804) with a target style according to certain aspects discussed herein. One or more processing devices (e.g., computing environment 100) implement operations depicted in FIG. 8 by executing suitable program code (e.g., machine learning model 112). For illustrative purposes, the example 800 is described with reference to certain examples depicted in the figures. Other implementations, however, are possible.

In this example, the machine learning model 112 uses shared parameters between a source domain and the exemplary few-shot images 802 to generate adapted images 804. The machine learning model 112 generates adapted images 804 that include an aesthetic appearance of a target style associated with the few-shot images 802. For example, the adapted images 804 may include one or more target parameters of the target style that are associated with the few-shot images 802. The adapted images 804 include a similar overall aesthetic, e.g., sharing some features with the caricatures depicted in the few-shot images 802, while preserving diversity from the source domain.

Figure 9:
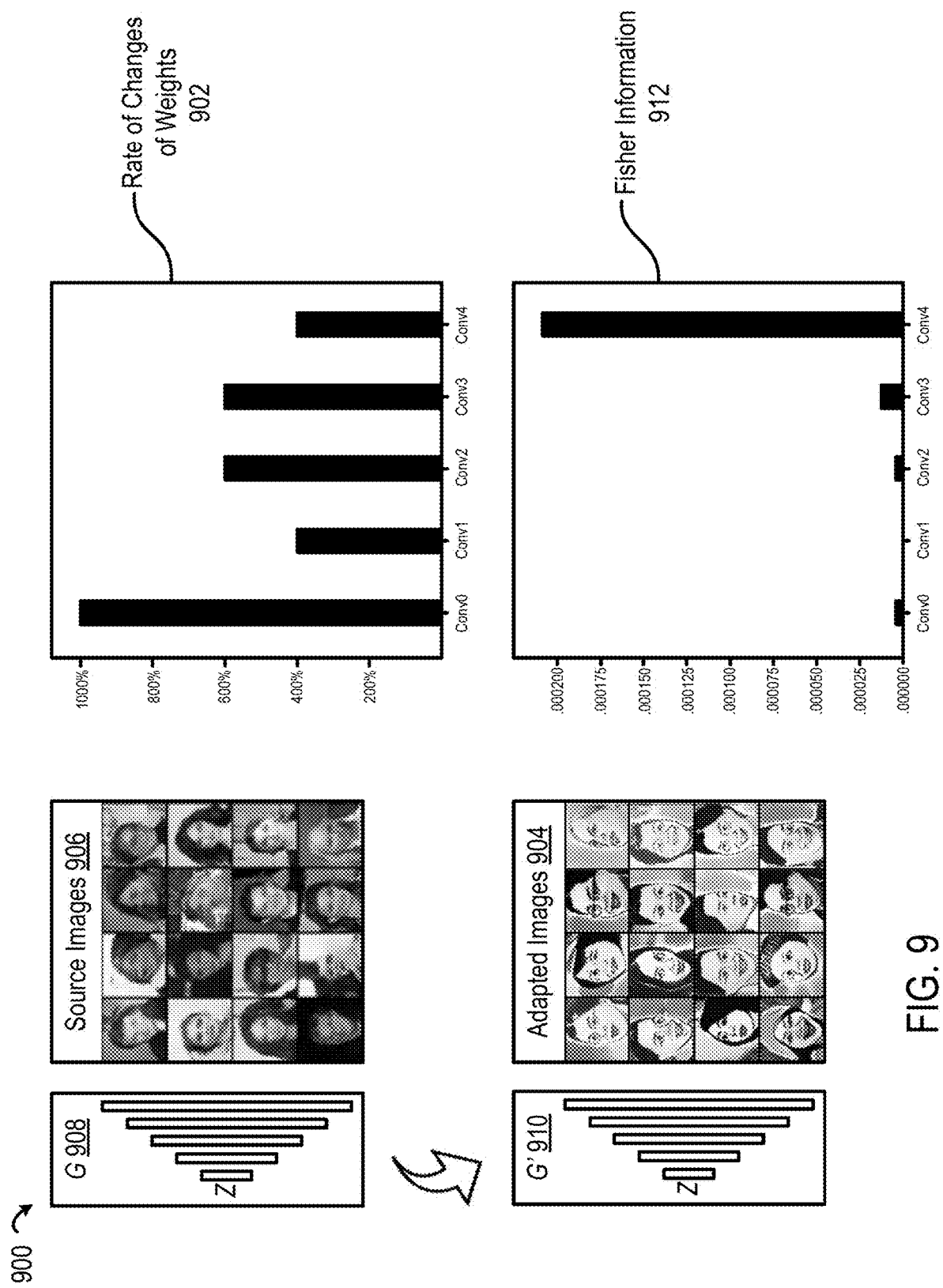
FIG. 9 depicts examples of images that are used in processes for training a machine learning model to transform source images using few-shot image generation via self-adaptation, e.g., as described in FIGS. 3-5, with plots of scaled results of such training, and according to certain aspects of this disclosure.

FIG. 9 depicts examples 900 of images that are used in processes for training a machine learning model to transform source images using few-shot image generation via self-adaptation with plots of scaled results of such training, according to certain aspects of this disclosure. In particular, FIG. 9 depicts examples 900 of images that are used in processes for training a machine learning model for transforming a large source domain (e.g., that includes source images 906) into a target style of a target domain (e.g., adapted images 904) using few-shot image generation via self-adaptation. One or more operations described with respect to FIG. 9 transform source images using an image processing system (e.g., image processing system 108). The image processing system 108 trains a machine learning model (e.g., machine learning model 112) to generate adapted images (e.g., adapted images 904) with a target style according to certain aspects discussed herein. One or more processing devices (e.g., computing environment 100) implement operations depicted in FIG. 9 by executing suitable program code (e.g., machine learning model 112). For illustrative purposes, the example 900 is described with reference to certain examples depicted in the figures. Other implementations, however, are possible.

In this example, the machine learning model 112 generates adapted images 904 using a target style associated with few-shot images. For instance, machine learning model 112 generates adapted images 904 from source images 906 into the target style according to any of the techniques described herein. The source domain includes a subset of source images 906 that depict certain examples provided by a generator G 908 for a pre-trained generative model. The generator G 908 includes all of the capabilities described above, e.g., with respect to pre-trained generative model 110 and generator G 608 of FIGS. 1 and 6, respectively.

The machine learning model 112 generates the set of adapted images 904 in a target style, for example, using an adapted generator G' 910 for an adapted generative model. In some examples, adapted generator G' 910 includes all of the capabilities described above, e.g., with respect to the adaptation engine 114 and adapted generator G' 610 of FIGS. 1 and 6, respectively. Additionally, while the generators G 908 and G' 910 are depicted as having five convolutional layers, it should be appreciated that each of the generators G 908 and G' 910 includes any suitable number of or type of convolutional layers.

In this example, FIG. 9 also depicts statistical information derived from an analysis of the generators G 908 and G' 910. In particular, a rate of changes of weights 902 and Fisher information 912 is shown for the generators G 908 and G' 910 over five convolutional layers (e.g., Conv0-Conv4), which are implemented in the form of two substantially similar five-layer DCGAN networks. The rate of changes of weights 902 indicates a comparative rate of changes for weights at different convolutional layers between the generators G 908 and G' 910. The Fisher information 912 reflects an average Fisher information for weights at different convolutional layers in the generator G 908.

The rate of changes of weights 902 and Fisher information 912 indicate that the weights change the least for the adapted generator G' 910 in the last convolutional layer, Conv4. In some examples, latter convolutional layers, e.g., the last convolutional layer Conv4, is used by the adapted generator G' 910 to synthesize low-level features shared across domains. Further, in some examples, low-level features include colors, textures, edges, or contours, etc. And in some examples, such low-level features are shared across domains, thereby allowing the adapted generator G' 910 to preserve important features by adapting these low-level features in later convolutional layers.

Figure 10:
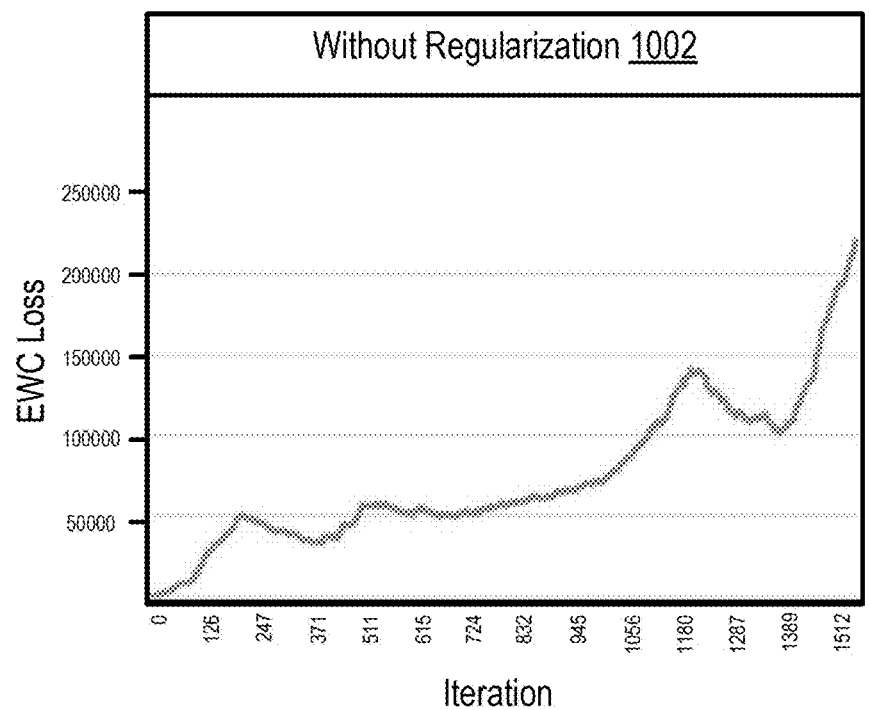
FIG. 10 depicts an example of plots having scaled results of training a machine learning model to transform source images using image generation, as described in FIGS. 3-5, and according to certain aspects of this disclosure.
Figure 10:
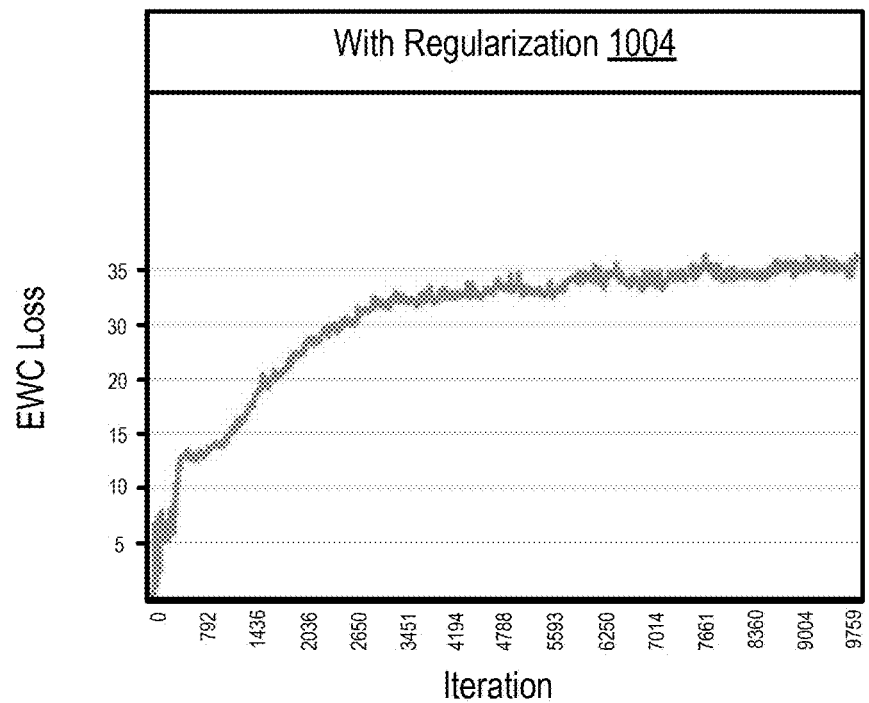

FIG. 10 depicts an example 1000 of plots having scaled results of training a machine learning model to transform source images using few-shot image generation via self-adaptation, according to certain aspects of this disclosure. Specifically, the example 1000 depicts certain advantages of using few-shot image generation via self-adaptation. One or more operations described with respect to FIG. 10 transform source images using an image processing system (e.g., image processing system 108). The image processing system 108 trains a machine learning model (e.g., machine learning model 112) to generate adapted images with a target style according certain aspects discussed herein. One or more processing devices (e.g., computing environment 100) implement operations depicted in FIG. 10 by executing suitable program code (e.g., machine learning model 112). For illustrative purposes, the example 1000 is described with reference to certain examples depicted in the figures. Other implementations, however, are possible.

The example 1000 shows an overall effectiveness of EWC loss. In this example, a plot of EWC loss is shown without regularization 1002 and a plot of EWC loss is shown with regularization 1004. Both plots show image generation results for an artistic target domain adapted from a source domain of real faces, and loss values in each of the two plots are amplified by the same scalar for better illustration. Further, the source domain included images having the same size of 256×256 pixels. In this example, each of the plots without regularization 1002 and with regularization 1004 was generated during target adaptation.

As described above with respect to FIG. 1, regularization loss is calculated, e.g., by the parameter analysis engine 116 using the following expression.

$$L_{adapt} = L_{adv} + \lambda \sum_i F_i(\theta_i - \theta_{S,i})^2$$

Here, the regularization loss (e.g., the adaptation loss $L_{adapt}$) is calculated by adding the adversarial loss described above (e.g., $L_{adv}$), $F_i$ represents a Fisher information matrix, $\theta$ represents the values for parameters associated with the target style, $\theta_s$ represents the learned values of weights of parameters, and the EWC loss is represented by the second term $\lambda \Sigma_i F_i(\theta_i - \theta_{S,i})^2$. But the plot without regularization 1002 was generated by ablating the second term $\lambda \Sigma_i F_i(\theta_i - \theta_{S,i})^2$, excluding the EWC loss. Thus, the plot without regularization 1002 depicts a rapid change in weights without any regularization, which is implemented by setting $\lambda=0$. The plot without regularization 1002 shows a substantial deviation from an original weight over the course of just a few hundred iterations. As a result, images generated using techniques corresponding to the plot without regularization 1002 (e.g., without the EWC loss) include results that are overfitted and are near regenerations of example images.

In contrast, the plot with regularization 1004 includes the second term $\lambda \Sigma_i F_i(\theta_i - \theta_{S,i})^2$ that is used to iteratively calculate the EWC loss during target adaptation. The plot with regularization 1004 shows that weights assigned to various parameters change slowly in early iterations of training the machine learning model 112. Such gradual changes results in an increase of EWC loss over time. In addition, as the EWC loss gradually saturates, the weights become unchanged, which is shown as the plot with regularization 1004 approaches a convergence point. Thus, by adapting few-shot images gradually over time, e.g., using an applied EWC loss, values associated with the original weights are altered while an overall amount of diversity of the weighted parameters is preserved.

Figure 11:
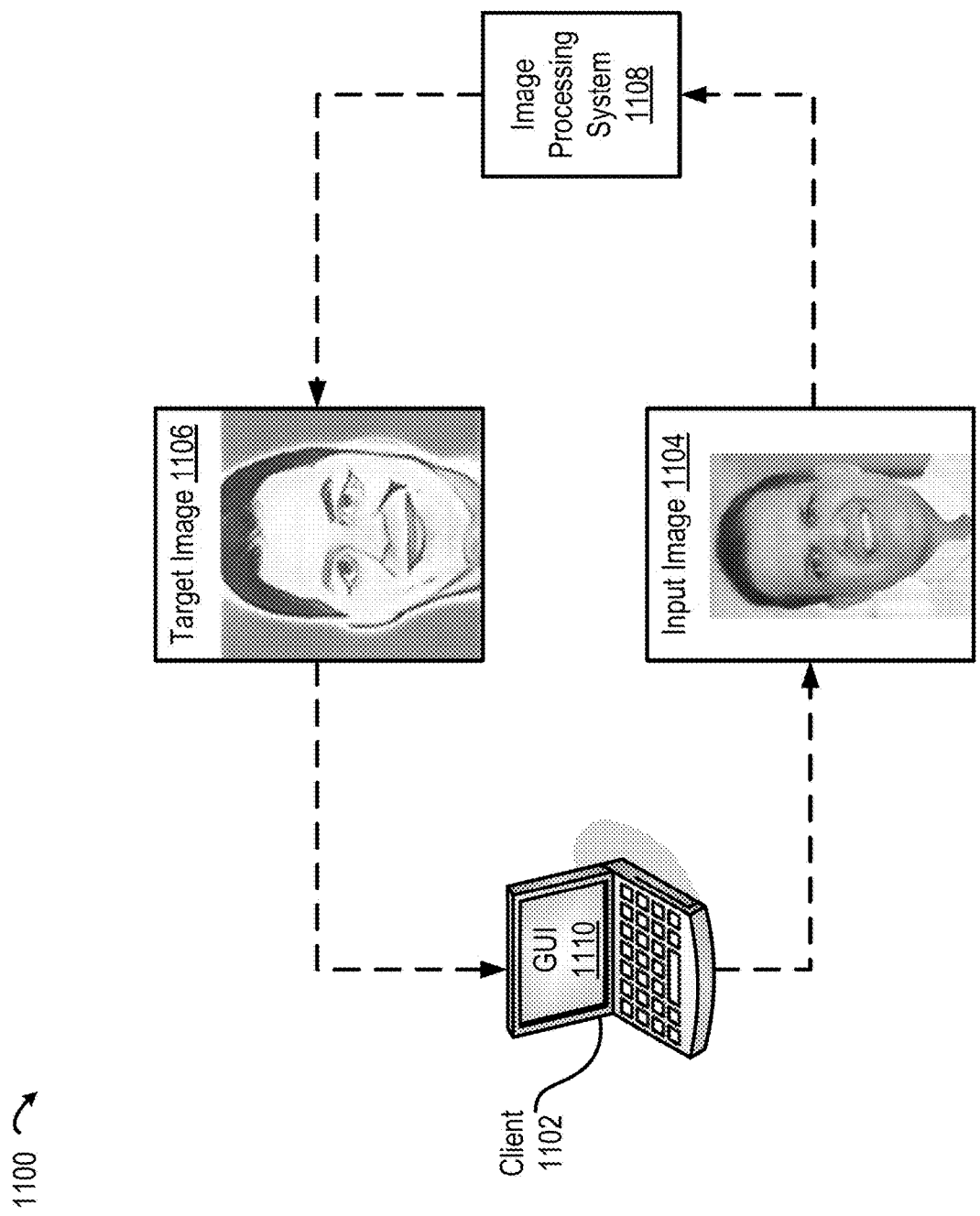
FIG. 11 depicts an example of images that are used in processes for using a machine learning model trained to transform source images using few-shot image generation via self-adaptation, e.g., as described in FIG. 2, and according to certain aspects of this disclosure.

Example of Transforming an Input Image into a Target Style Using a Machine Learning Model Trained for Few-Shot Image Generation Via Self-Adaptation FIG. 11 depicts an example 1100 of images that are used in processes for using a machine learning model trained to transform source images using few-shot image generation via self-adaptation, according to certain aspects of this disclosure. In particular, FIG. 11 depicts a simplified example 1100 of a diagram of using a trained machine learning model for transforming an image (e.g., input image 1104) into a target style (e.g., of target image 1106) using few-shot image generation via self-adaptation. Operations described with respect to FIG. 11 transform images using an image processing system (e.g., image processing system 108). Image processing system 108 uses a trained machine learning model (e.g., machine learning model 112) to generate a target image 1106 in a target style. One or more processing devices (e.g., computing environment 100) perform operations depicted in FIG. 11 by executing suitable program code (e.g., machine learning model 112). For illustrative purposes, example 1100 is described with reference to certain examples depicted in the figures, however, other implementations are possible.

In the example 1100 shown in FIG. 11, a client device 1102 accesses an application, e.g., via a GUI 1110. The client device 1102 communicates with one or more remote computing devices (e.g., image database 106 or image processing system 1108) using a network connection (e.g., via data network 104). In this example, the client device 1102 transmits a request to transform an input image 1104 to the image processing system 1108 using GUI 1110. The image processing system 1108 executes a machine learning model (e.g., machine learning model 112) that is trained to transform the input image 1104 into a target style (e.g., of target image 1106). The client device 1102 and the image processing system 1108 include all of the capabilities described above with respect to FIG. 1 and the client devices 102 and the image processing systems 108, respectively.

In the example 1100, the client device 1102 accesses an application by executing suitable program code for the operations described herein. For instance, the client device 1102 accesses the application by launching it using the GUI 1110. In some examples, the GUI 1110 includes the application. Further, the application includes user-selectable options that correspond to one or more desirable target styles. In some examples, a user selects an input image (e.g., a photograph) for transformation. Further, in some examples, the user selects the input image and a desired target style for the transformation.

In some examples, the GUI 1110 includes user-selectable options. For instance, some GUIs 1110 include one or more icons, buttons, search bars, checkboxes, dropdowns, lists, menus, sliders, any other GUI elements capable of receiving a user input, or a combination of these. In one example, the GUI 1110 allows the user to separately manipulate one or more image parameters. For example, the GUI 1110 includes user-selectable options for separate image parameters such as a color, filter, resolution, size, texture, brightness, another suitable image parameter, or any other suitable image settings. In some examples, these user-selectable options allows a user to refine image parameters corresponding to the target style. Further, in some examples, the user-selectable options allow a user to modify (e.g., adjust or otherwise alter) an available (e.g., a user-selected or selectable) target style.

In some examples, the application includes a camera or video-recording device. For example, the user takes photographs or records video content using the application. In some examples, the user accesses previously recorded images (e.g., photographs, drawings, videos) using the application or another suitable application. In some examples, the previously-recorded image content includes one or more photographs, videos, vlogs, audiovisual messages, audiovisual clips, image files, drawings, movies, graphics, social media content (e.g., social media stories), GIFs, or another suitable form of multimedia content. In some examples, the user selects the target style from among a predetermined list of target styles.

In one example, the user has captured an image that includes a self-portrait (e.g., a selfie). The user enhances the selfie using the application. For example, the user selects an option to transform the selfie into a target style. The user uses the application and/or GUI 1110 to access a list of available target styles (e.g., via a menu) associated with a desired target style. In one example, the user desires to transform the selfie into an emoji in a particular artistic style and she selects an option for "emoji" from a menu of artistic target styles. In some examples, the user selects an option for "emoji" from among a list of available artistic styles for emoticons (e.g., a sub-menu). In this example, the sub-menu includes emoticons such as emojis, Bitmojis™ or smileys, etc. In some examples, various features or parameters of a selected target style are retrieved from a remote library of target styles.

Continuing with the example 1100, the image processing system 1108 receives the request from the client device 1102. The image processing system 1108 responsively executes suitable program code (e.g., machine learning model 112) to transform the input image 1104 into the target image 1106. The image processing system 1108 provides the input image 1104 to the machine learning model 112. The machine learning model 112 is trained to transform the input image 1104 into the target style.

In some examples, the machine learning model 112 transforms the input image 1104 into the target image 1106 that includes the target style. In this example, the target image 1106 includes various features that are associated with the input image 1104. For instance, the input image 1104 and the target image 1106 both share similar features such as a directionality of combed hair, eyes having dark irises in contrast with bright sclerae, smile lines, and a pronounced chin. These shared features combine to produce a target image 1106 that is recognizable as having an overall appearance that is associated with the input image 1104. In addition to these common features, the target image 1106 also reflects a trained model that is capable of generating varied images, while maintaining diversity and avoiding over-fitting.

For instance, the target image 1106 reflects a result from a machine learning model trained to implement learned aesthetics that are associated with the target domain. Specifically, the generated target image 1106 includes various changes to facial features such as an altered facial angle, exaggerated nose, reshaped eyes, more pronounced eyebrows, and de-emphasized ears. The target image 1106 also reflects changes to the overall aesthetic, e.g., by changing the facial expression of the input image 1104 from an open smile to a closed smile, while selectively omitting certain smile lines and/or crow's feet, thereby creating a more youthful but slightly less jovial appearance. Thus, the target image 1106 depicts a diverse set of features of the target style, while avoiding certain pitfalls of merely re-generated input images. In some examples, the target style is determined using image information associated with the input image 1104 (e.g., a user-selected target style). Further, in some examples, the target style is determined by the image processing system 1108 and/or using a default target style.

The machine learning model 112 transforms the input image 1104 into the target image 1106 using one or more parameters associated with the target style. The machine learning model 112 performs the transformation based on the training techniques discussed herein, modifying one or more features of the input image 1104 to match the target style (e.g., using parameters of the target style). The machine learning model 112 provides the generated target image 1106 to image processing system 1108. The image processing system 1108 transmits the target image 1106 to the client device 1102, e.g., via data network 104.

Figure 12:
FIG. 12 depicts examples of conventional techniques that involve operations avoided by certain aspects of this disclosure.
Figure 12:
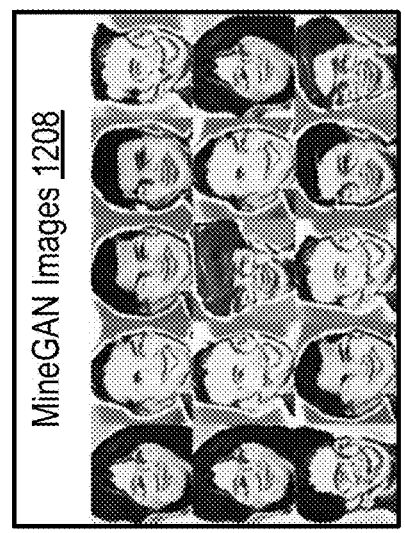
Figure 12:
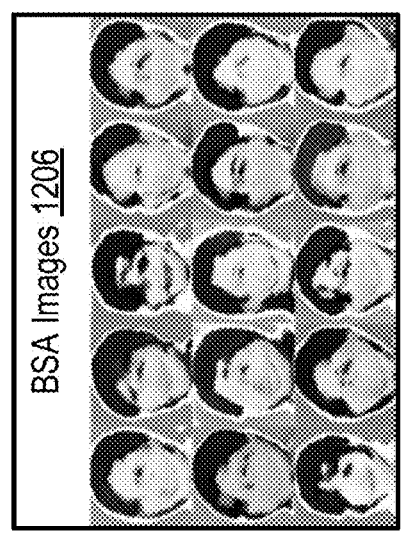
Figure 12:
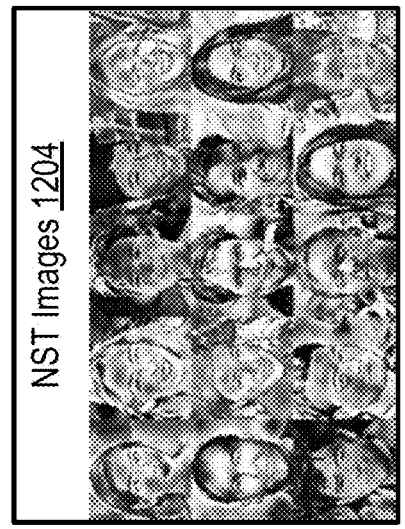

Examples of Computational Improvements Facilitated by Few-Shot Image Generation Via Self-Adaptation Certain aspects described above, with respect to FIGS. 1-11, enable improved image generation that preserves diverse features using less training data than, for example, conventional image generation techniques. For instance, FIG. 12 depicts examples 1200 of conventional techniques that involve operations avoided by certain aspects of this disclosure. For example, some existing models require tedious manual designs that are less effective in extremely low-data cases. The examples 1200 shown in FIG. 12 illustrate results produced by some of these less effective models, which include Neural Style Transfer (NST) images 1204, Batch Statistics Adaptation (BSA) images 1206, and MineGAN images 1208.

In this example, the NST images 1204, BSA images 1206, and MineGAN images 1208 were generated using few-shot images 1202. The few-shot images 1202 are substantially the same as few-shot images 802, which were discussed above, with respect to FIG. 8. But in this example, the NST images 1204, BSA images 1206, and MineGAN images 1208 were generated using a trained NST model, a trained BSA model, and a trained MineGAN model, respectively. And in this example, an image was randomly selected from the few-shot images 1202 to generate each of the NST images 1204, BSA images 1206, and MineGAN images 1208, for example, using a randomly sampled image from a source domain (e.g., a source image 606 from a corresponding source domain).

The trained NST model separates and recombines image content using parameters derived from semantic information, while the trained BSA model and trained MineGAN model both focus on adapting models from a source domain to a target domain by introducing additional parameters. For instance, the BSA model includes additional batch norm layers, e.g., by modifying a BigGAN generator to learn new parameters during an adaptation. The MineGAN model adds a small mining network to a Progressive GAN generator, fine-tuning the small mining network separately from a joint fine-tuning operation of the small mining network and the Progressive GAN generator. Each of the trained NST model, trained BSA model, and trained MineGAN model was implemented using a StyleGAN framework.

In some examples, the StyleGAN framework includes normalizing and mapping inputs to an intermediate latent space. The intermediate latent space controls the StyleGAN generator using adaptive instance normalization (AdaIN) for each convolutional layer. Further, the StyleGAN framework includes adding Gaussian noise after each convolution and before evaluating nonlinearity. And in some examples, the StyleGAN generator generates stochastic details for images using noise inputs that are directly input into the generator.

But in this example, the trained NST model, trained BSA model, and trained MineGAN model described above generated the NST images 1204, BSA images 1206, and MineGAN images 1208 using a source domain of real faces and the examples shown in the few-shot images 1202. The examples 1200 depict some examples of results that reflect the computational deficiencies associated with these conventional techniques. For instance, the trained NST model generated NST images 1204 that transferred certain global colors and textures of the target examples, but the NST images 1204 include cluttered features and do not capture many high-level characteristics (e.g., geometric shapes) of the target style. Similarly, the trained BSA model generated BSA images 1206 that appear blurry and out-of-focus. Additionally, the BSA images 1206 illustrate a common failure of mode collapse, e.g., depicting several resulting images that are substantially, visually similar. Further, the trained MineGAN model generated MineGAN images 1208 that are over-fitted and generally less diverse. For instance, the MineGAN images 1208 include several results that include a near re-generation of certain features from the given examples in the few-shot images 1202.

Example of a Computing System for Implementing Certain Aspects

Figure 13:
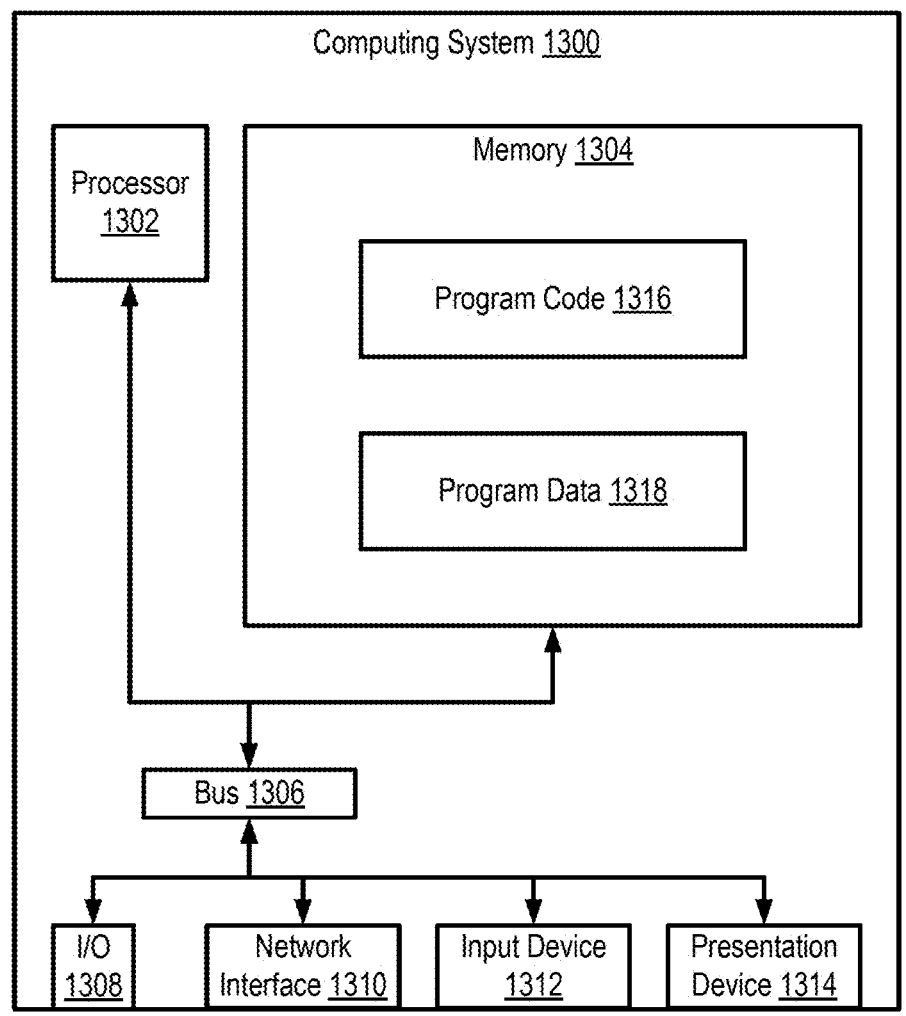
FIG. 13 depicts an example of a computing system that perform certain operations described herein, according to certain aspects of this disclosure.

Any suitable computing system can be used for performing the operations described herein. FIG. 13 depicts an example of a computing system 1300 that performs certain operations described herein, according to certain aspects of this disclosure. In some aspects, the computing system 1300 executes image processing system 108 of FIG. 1. In other aspects, separate computing systems having devices similar to those depicted in FIG. 13 (e.g., a processor, a memory, etc.) separately execute parts of the image processing system 108.

The example of a computing system 1300 includes a processor 1302 communicatively coupled to one or more memory devices 1304. The processor 1302 executes computer-executable program code 1316 stored in memory device 1304, accesses information (e.g., program data 1318) stored in the memory device 1304, or both. Examples of the processor 1302 include a microprocessor, an application-specific integrated circuit ("ASIC"), a field-programmable gate array ("FPGA"), or any other suitable processing device. Processor 1302 includes any number of processing devices, including a single processing device.

The memory device 1304 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device that reads instructions. The instructions includes processor-specific instructions generated by a compiler or an interpreter from code written in any suitable computer-programming language, including, for example, C, C++, C#, Visual Basic, Java, Python, Perl, JavaScript, and ActionScript.

The computing system 1300 also includes a number of external or internal devices, such as input or output devices. For example, the computing system 1300 is shown with one or more input/output ("I/O") interfaces 1308. An I/O interface 1308 receives input from input devices (e.g., input device 1312) or provide output to output devices. One or more buses 1306 are also included in the computing system 1300. The bus 1306 communicatively couples one or more components of a respective one of the computing system 1300.

The computing system 1300 executes program code 1316 that configures the processor 1302 to perform one or more operations described herein. For example, the program code 1316 includes the machine learning model 112 (including the adaptation engine 114, the parameter analysis engine 116, and the target generation engine 118), the pre-trained generative model 110, or other suitable applications to perform operations described herein. The program code 1316 resides in the memory device 1304 or any suitable computer-readable medium that is executable by the processor 1302 or another suitable processor. In additional or alternative aspects, the program code 1316 described above is stored in one or more other memory devices accessible via data network 104.

The computing system 1300 also includes a network interface device 1310. The network interface device 1310 includes any device or group of devices suitable for establishing a wired or wireless data connection to one or more data networks. Non-limiting examples of the network interface device 1310 include an Ethernet network adapter, a modem, and/or the like. The computing system 1300 is able to communicate with one or more other computing devices via data network 104 using the network interface device 1310.

In some aspects, the computing system 1300 also includes presentation device 1314. A presentation device 1314 includes any device or group of devices for providing visual, auditory, or other suitable sensory output. Non-limiting examples of presentation device 1314 include a touchscreen, a monitor, a speaker, a separate mobile computing device, etc. In some aspects, presentation device 1314 includes a remote client-computing device, such as client device 102, that communicates with computing system 1300 using one or more data networks (e.g., data network 104) described herein. Other aspects omit presentation device 1314.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, this disclosure has been presented for the purpose of providing examples rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The systems discussed herein are not limited to any particular hardware architecture or configuration. A computing device includes any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, script, or other type of language or combinations of languages may be used to implement the teachings herein in software to be used in programming or configuring a computing device. The order of the blocks presented in the examples above can be varied—e.g., blocks can be re-ordered, combined, and/or broken into sub-blocks. Certain blocks or processes can be performed in parallel.

The invention claimed is:

1. A method in which one or more processing devices perform operations comprising:
   receiving a request to transform an input image into a target image;
   providing the input image to a machine learning model trained to adapt images, wherein the machine learning model is trained based on an adapted source domain, the adapted source domain comprising source images that have been modified based on rates of change of target parameters associated with a target style in a target domain, wherein the machine learning model is trained by:
   generating an adapted generative model using the target parameters associated with the target style;
   applying weights to the target parameters based on their respective rates of change; and
   generating the target image by applying the machine learning model to the input image, wherein the target image comprises the target style.

2. The method of claim 1, wherein the machine learning model is trained by:
   determining the rates of change of target parameters associated with the target style in the target domain comprises:
   selecting a subset of the source images from a source domain;
   identifying the target parameters associated with the target style; and
   adapting a pre-trained generative model by applying an adversarial loss to the target parameters associated with the target style, the pre-trained generative model configured to generate the adapted source domain.

3. The method of claim 1 wherein applying the weights comprises:
   convolving, iteratively, a plurality of layers using a pre-trained generative model configured to generate the adapted source domain and an adapted generative model; and
   determining an average rate of change of weights for each of the target parameters at each of the plurality of layers.

4. The method of claim 3, wherein determining the average rate of change of the weights for each of the target parameters at each of the plurality of layers comprises:
   computing, for each of the plurality of layers, the average rate of change of the weights using an expression:

$$\Delta = \frac{1}{N} \sum_i \frac{|\theta_{G',i} - \theta_{G,i}|}{\theta_{G,i}} \times 100\%,$$

wherein G represents a generator for the pre-trained generative model, G' represents a generator for the adapted generative model, N represents a number of the target parameters, $\theta_{G,i}$ represents an i-th parameter in the pre-trained generative model, and G' represents the adapted generative model.

5. The method of claim 1, wherein generating the adapted generative model further comprises applying an adversarial loss to the target parameters associated with the target style to a pre-trained generative model using a deep convolutional generative adversarial network (DCGAN), wherein the pre-trained generative model is configured to generate the adapted source domain, and wherein applying the adversarial loss to the target parameters comprises:
   computing the adversarial loss using an expression:

$$L_{adv} = \min_G \max_D \varepsilon_{x \sim P_{data}(x)}[\log D(x)] + \varepsilon_{z \sim P_z(z)}[\log(1 - D(G(z)))],$$

and
   wherein G represents a generator, D represents a discriminator, $P_{data}(x)$ represents a distribution of noise associated with a subset of source images, and $P_z(z)$ represents a distribution of noise associated with the target parameters.

6. The method of claim 5, wherein the adapted source domain is generated in part by:
   generating a plurality of weighted parameters by applying a weight to each of the target parameters based on the rates of change; and
   wherein the adapted source domain is generated in part by:
   regularizing the plurality of weighted parameters to create an importance factor for each of the plurality of weighted parameters; and
   applying the plurality of weighted parameters to the source domain based on the importance factors.

7. The method of claim 6, wherein regularizing the plurality of weighted parameters to create the importance factor for each of the plurality of weighted parameters comprises:
   generating importance data for each of the plurality of weighted parameters, wherein the importance data comprises Fisher information F and is computed using an expression:

$$F = E\left[-\frac{\partial^2}{\partial \theta_s^2} \mathcal{L}(X|\theta_s)\right],$$

and
   wherein $\theta_S$ represents the plurality of weighted parameters, and $\mathcal{L}(X|\theta_S)$ represents a log-likelihood function that is configured to provide an equivalent of a binary cross-entropy loss using an output of the discriminator D.

8. The method of claim 7, wherein the machine learning model is further trained by:
determining an elastic weight consolidation (EWC) loss using the Fisher information F associated with each of the plurality of weighted parameters; and
transforming the source domain into the adapted source domain using the EWC loss.

9. The method of claim 8, wherein determining the EWC loss comprises:
computing the EWC loss by adding a regularization loss configured to penalize a rate of change associated with the target parameters and using an expression:

$$L_{adapt}=L_{adv}+\lambda \Sigma_t F_t(\theta_t-\theta_{S,t})^2,$$

wherein $L_{adapt}$ represents the EWC loss, and $\lambda$ represents a regularization weight.

10. A system comprising:
one or more processing devices; and
a non-transitory computer-readable medium communicatively coupled to the one or more processing devices and storing instructions,
wherein the one or more processing devices are configured to execute the instructions and thereby perform operations comprising:
accessing training data comprising a source domain that includes a plurality of source images and a target domain that includes a limited number of artistic images, wherein the target domain comprises a target style; and
generating, using a pre-trained generative model, an adapted source domain comprising a plurality of adapted images, wherein the plurality of adapted images comprises the target style, and wherein the adapted source domain is generated by:
determining a rate of change for each of a plurality of parameters associated with the target style;
generating an adapted generative model using the plurality of parameters associated with the target style;
generating a plurality of weighted parameters by applying a weight to each of the plurality of parameters based on the rate of change;
applying the plurality of weighted parameters to the source domain; and
outputting a trained machine learning model configured to generate, from an input image, a target image comprising the target style.

11. The system of claim 10, wherein applying a weight to each of the plurality of parameters based on the rate of change comprises:
convolving, iteratively, a plurality of layers using the pre-trained generative model and an adapted generative model; and
determining an average rate of change of weights for each of the plurality of parameters at each of the plurality of layers, wherein determining the average rate of change of the weights comprises:
computing, for each of the plurality of layers, the average rate of change of the weights using an expression:

$$\Delta = \frac{1}{N}\sum_i \frac{|\theta_{G',i}-\theta_{G,i}|}{\theta_{G,i}} \times 100\%,$$

wherein G represents the pre-trained generative model, G' represents the adapted generative model, N represents a number of the plurality of parameters, $\theta_{G,i}$ represents an i-th parameter in the pre-trained generative model, and G' represents the adapted generative model.

12. The system of claim 10, wherein the pre-trained generative model comprises a DCGAN, and the operations further comprising:
generating an adapted generative model by applying an adversarial loss to the plurality of parameters associated with the target style to the pre-trained generative model using the DCGAN, wherein applying the adversarial loss to the plurality of parameters comprises:
computing the adversarial loss using an expression:

$$L_{adv} = \min_G \max_D \varepsilon_{x \sim P_{data}(x)}[\log D(x)] + \varepsilon_{z \sim P_z(z)}[\log(1-D(G(z)))],$$

and
wherein G represents a generator, D represents a discriminator, $P_{data}(x)$ represents a distribution of noise associated with a subset of source images, and $P_z(z)$ represents a distribution of noise associated with the plurality of parameters.

13. The system of claim 12, wherein the adapted source domain is generated in part by:
regularizing the plurality of weighted parameters to create an importance factor for each of the plurality of weighted parameters,
wherein regularizing the plurality of weighted parameters to create the importance factor for each of the plurality of weighted parameters comprises:
generating importance data for each of the plurality of weighted parameters, wherein the importance data comprises Fisher information F and is computed using an expression:

$$F = E\left[-\frac{\partial^2}{\partial \theta_s^2} \mathcal{L}(X|\theta_s)\right],$$

and
wherein $\theta_S$ represents the plurality of weighted parameters, and $\mathcal{L}(X|\theta_s)$ represents a log-likelihood function that is configured to provide an equivalent of a binary cross-entropy loss using an output of the discriminator D; and
applying the plurality of weighted parameters to the source domain based on the importance factors.

14. The system of claim 13, the operations further comprising:
determining an EWC loss using the Fisher information F associated with each of the plurality of weighted parameters;
computing the EWC loss by adding a regularization loss configured to penalize a rate of change associated with the plurality of parameters and using an expression:

$$L_{adapt}=L_{adv}+\lambda \Sigma_t F_t(\theta_t-\theta_{S,t})^2,$$

wherein $L_{adapt}$ represents the EWC loss, and $\lambda$ represents a regularization weight; and
transforming the source domain into the adapted source domain using the EWC loss.

15. A method in which one or more processing devices perform operations comprising:
- accessing training data comprising a source domain that includes a plurality of source images and a target domain that includes a limited number of artistic images, wherein the target domain comprises a target style;
- a step for generating an adapted source domain comprising a plurality of adapted images, wherein the plurality of adapted images comprises the target style;
- training a machine learning model on the plurality of adapted images, the adapted source domain comprising source images that have been modified based on rates of change of target parameters associated with the target style in the target domain, wherein the machine learning model is trained by:
  - generating an adapted generative model using the target parameters associated with the target style;
  - applying weights to the target parameters based on their respective rates of change; and
- outputting the machine learning model configured to apply the target style to an input image using the adapted source domain.

16. The method of claim 15 wherein determining the rate of change for each of the parameters comprises:
- selecting a subset of source images from the source domain; and
- adapting the pre-trained generative model by applying an adversarial loss to the target parameters associated with the target style.

17. The method of claim 16, the operations further comprising:
- generating an adapted generative model using the target parameters associated with the target style by:
  - convolving a plurality of layers using the pre-trained generative model and an adapted generative model; and
  - determining an average rate of change of weights for each of the target parameters,
  - wherein determining the average rate of change of the weights for each of the target parameters comprises:
- computing, for each of the plurality of layers, the average rate of change of the weights using an expression:

$$\Delta = \frac{1}{N} \sum_t \frac{|\theta_{G',i} - \theta_{G,i}|}{\theta_{G,i}} \times 100\%,$$

and
  - wherein G represents the pre-trained generative model, G' represents the adapted generative model, N represents a number of the target parameters, $\theta_{G,i}$ represents an i-th parameter in the pre-trained generative model, and G' represents the adapted generative model.

18. The method of claim 16, wherein the pre-trained generative model comprises a DCGAN, and the operations further comprising:
- generating an adapted generative model by applying an adversarial loss to weighted parameters associated with the target style to the pre-trained generative model using the DCGAN, wherein applying the adversarial loss to the weighted parameters comprises:
- computing the adversarial loss using an expression:

$$L_{adv} = \min_G \max_D \ \varepsilon_{x \sim P_{data}(x)}[\log D(x)] + \varepsilon_{z \sim P_z(z)}[\log(1 - D(G(z)))],$$

and
  - wherein G represents a generator, D represents a discriminator, $P_{data}(x)$ represents a distribution of noise associated with a subset of source images, and $P_z(z)$ represents a distribution of noise associated with the weighted parameters.

19. The method of claim 18, wherein the adapted source domain is generated in part by:
- regularizing the weighted parameters to create an importance factor for each of the weighted parameters,
- wherein regularizing the weighted parameters to create the importance factor for each of the weighted parameters comprises:
  - generating importance data for each of the weighted parameters, wherein the importance data comprises Fisher information F and is computed using an expression:

$$F = E\left[-\frac{\partial^2}{\partial \theta_s^2} \mathcal{L}(X|\theta_s)\right],$$

and
  - wherein $\theta_S$ represents the weighted parameters, and $\mathcal{L}(X|\theta_s)$ represents a log-likelihood function that is configured to provide an equivalent of a binary cross-entropy loss using an output of the discriminator D; and
- applying the weighted parameters to the source domain based on the importance factors.

20. The method of claim 19, the operations further comprising:
- determining an EWC loss using the Fisher information F associated with each of the weighted parameters;
- computing the EWC loss by adding a regularization loss configured to penalize a rate of change associated with the weighted parameters and using an expression:

$$L_{adapt} = L_{adv} + \lambda \Sigma_t F_t(\theta_t - \theta_{S,t})^2,$$

wherein $L_{adapt}$ represents the EWC loss, and $\lambda$ represents a regularization weight; and
- transforming the source domain into the adapted source domain using the EWC loss.

* * * * *